(12) United States Patent
Farrugia et al.

(10) Patent No.: US 8,580,472 B2
(45) Date of Patent: *Nov. 12, 2013

(54) ROSIN-BASED RESIN AND TONER CONTAINING SAME

(75) Inventors: Valerie M Farrugia, Oakville (CA); Ke Zhou, Oakville (CA); Guerino G Sacripante, Oakville (CA); Rina Carlini, Oakville (CA); Paul J Gerroir, Oakvile (CA)

(73) Assignee: Xerox Corporation, Norwalk, CT (US)

( * ) Notice: Subject to any disclaimer, the term of this patent is extended or adjusted under 35 U.S.C. 154(b) by 262 days.

This patent is subject to a terminal disclaimer.

(21) Appl. No.: 13/108,166

(22) Filed: May 16, 2011

(65) Prior Publication Data
US 2012/0183897 A1 Jul. 19, 2012

Related U.S. Application Data

(63) Continuation-in-part of application No. 13/007,683, filed on Jan. 17, 2011, now Pat. No. 8,431,303.

(51) Int. Cl.
G03G 9/087 (2006.01)

(52) U.S. Cl.
CPC .................................. *G03G 9/08755* (2013.01)
USPC ......... 430/109.4; 528/306; 527/600; 527/604

(58) Field of Classification Search
USPC ................ 430/109.4; 528/306; 527/600, 604
See application file for complete search history.

(56) References Cited

U.S. PATENT DOCUMENTS

| | | | |
|---|---|---|---|
| 2,017,866 A | 10/1935 | Morton | |
| 2,108,928 A | 2/1938 | Rummelsburg | |
| 2,136,525 A | 11/1938 | Rummelsburg | |
| 2,307,641 A | 1/1943 | Rummelsburg | |
| 2,322,316 A | 6/1943 | Rummelsburg | |
| 2,328,681 A | 9/1943 | Rummelsburg | |
| 2,375,618 A | 5/1945 | Bried | |
| 2,492,146 A | 12/1949 | Hampton | |
| 2,515,218 A | 7/1950 | Hampton | |
| 2,973,332 A | 2/1961 | Fikentscher et al. | |
| 4,414,146 A | 11/1983 | Olechowski | |
| 4,536,333 A | 8/1985 | Olechowski | |
| 4,968,575 A | 11/1990 | Matsumura et al. | |
| 7,150,952 B2 | 12/2006 | Matsushima et al. | |
| 7,932,008 B2 | 4/2011 | Kim et al. | |
| 2007/0264589 A1* | 11/2007 | Amaya et al. ................... | 430/56 |
| 2009/0069530 A1 | 3/2009 | Kimura et al. | |
| 2010/0055592 A1 | 3/2010 | Zhou et al. | |
| 2010/0297546 A1 | 11/2010 | Zhou et al. | |

FOREIGN PATENT DOCUMENTS

| | | |
|---|---|---|
| CN | 101029124 A | 9/2007 |
| JP | 60-170864 | 9/1985 |
| JP | 04-070765 A | 5/1992 |
| JP | 04-307557 A | 10/1992 |
| JP | 2005 350597 A | 12/2005 |

OTHER PUBLICATIONS

Diamond, Arthur S. and David Weiss (eds.), Handbook of Imaging Materials, 2nd ed., New York: Marcel-Dekker, Inc. (Nov. 2001) pp. 187-188.
Parkin, Jr. et al., "Thermal Dimerization of Rosin," Ind. Eng. Chem. Prod. Res. Dev., 8(3), pp. 304-306 (1969).
Sinclair et al., "Influence of Reaction Conditions on the Dimerization of Abietic Acid and Rosin," Ind. Eng. Chem. Prod. Res. Dev., 9(1), pp. 60-65 (1970).
Fujii et al., "Dimeric Components from the Dimerization of Abietic Acid," JAOCS, 64(8), pp. 1144-1149 (1987).

* cited by examiner

*Primary Examiner* — Christopher Rodee
(74) *Attorney, Agent, or Firm* — Judith L. Byorick

(57) ABSTRACT

Disclosed is a polyester resin comprising the polycondensation product of (a) at least one diacid, acid ester, or diester; and (b) at least one diol; wherein either (i) at least one diacid, acid ester, or diester comprises a rosin diacid, rosin acid ester, or rosin diester; or (ii) at least one diol comprises a rosin diol, and wherein at least one of the rosin diacid, rosin acid ester, rosin diester, or rosin diol is either (A) an ester of a functionalized rosin or an ester of a reduced functionalized rosin, or (B) a dimerized rosin. Also disclosed is a toner composition comprising particles which comprise the disclosed polyester resin and an optional colorant.

19 Claims, 2 Drawing Sheets

US 8,580,472 B2

ROSIN-BASED RESIN AND TONER CONTAINING SAME

This application is a continuation-in-part of U.S. Application Ser. No. 13/007,683, filed Jan. 17, 2011, the disclosure of which is totally incorporated herein by reference.

CROSS-REFERENCE TO RELATED APPLICATIONS

Reference is made to U.S. application Ser. No. 12/714,677, filed Mar. 1, 2010, entitled "Bio-Based Amorphous Polyester Resins for Emulsion Aggregation Toners," with the named inventors Valerie M. Farrugia, Guerino G. Sacripante, Ke Zhou, Edward G. Zwartz, and Michael S. Hawkins, the disclosure of which is totally incorporated herein by reference.

BACKGROUND

Disclosed herein are resins suitable for use in toner compositions used in imaging applications. More specifically, disclosed herein are rosin-derived resins and toners containing these resins.

The formation and development of images on the surface of photoconductive materials by electrostatic means is well known. The basic electrophotographic imaging process, as taught by C. F. Carlson in U.S. Pat. No. 2,297,691, entails placing a uniform electrostatic charge on a photoconductive insulating layer known as a photoconductor or photoreceptor, exposing the photoreceptor to a light and shadow image to dissipate the charge on the areas of the photoreceptor exposed to the light, and developing the resulting electrostatic latent image by depositing on the image a finely divided electroscopic material known as toner. Toner typically comprises a resin and a colorant. The toner will normally be attracted to those areas of the photoreceptor which retain a charge, thereby forming a toner image corresponding to the electrostatic latent image. This developed image may then be transferred to a substrate such as paper. The transferred image may subsequently be permanently affixed to the substrate by heat, pressure, a combination of heat and pressure, or other suitable fixing means such as solvent or overcoating treatment.

Numerous processes are within the purview of those skilled in the art for the preparation of toners. Emulsion aggregation (EA) is one such method. Emulsion aggregation toners can be used in forming print and/or xerographic images. Emulsion aggregation techniques can entail the formation of an emulsion latex of the resin particles by heating the resin, using emulsion polymerization, as disclosed in, for example, U.S. Pat. No. 5,853,943, the disclosure of which is totally incorporated herein by reference. Other examples of emulsion/aggregation/coalescing processes for the preparation of toners are illustrated in, for example, U.S. Pat. Nos. 5,278,020, 5,290,654, 5,302,486, 5,308,734, 5,344,738, 5,346,797, 5,348,832, 5,364,729, 5,366,841, 5,370,963, 5,403,693, 5,405,728, 5,418,108, 5,496,676, 5,501,935, 5,527,658, 5,585,215, 5,650,255, 5,650,256, 5,723,253, 5,744,520, 5,747,215, 5,763,133, 5,766,818, 5,804,349, 5,827,633, 5,840,462, 5,853,944, 5,863,698, 5,869,215, 5,902,710; 5,910,387; 5,916,725; 5,919,595; 5,925,488, 5,977,210, 5,994,020, 6,576,389, 6,617,092, 6,627,373, 6,638,677, 6,656,657, 6,656,658, 6,664,017, 6,673,505, 6,730,450, 6,743,559, 6,756,176, 6,780,500, 6,830,860, and 7,029,817, and U.S. Patent Publication No. 2008/0107989, the disclosures of which are totally incorporated herein by reference.

Polyester EA ultra low melt (ULM) toners have been prepared utilizing amorphous and crystalline polyester resins as disclosed in, for example, U.S. Pat. No. 7,547,499, the disclosure of which is totally incorporated herein by reference.

Two exemplary emulsion aggregation toners include acrylate based toners, such as those based on styrene acrylate toner particles as illustrated in, for example, U.S. Pat. No. 6,120,967, and polyester toner particles, as disclosed in, for example, U.S. Pat. Nos. 5,916,725 and 7,785,763 and U.S. Patent Publication 2008/0107989, the disclosures of each of which are totally incorporated herein by reference.

Energy and environmental policies, increasing and volatile oil prices, and public/political awareness of the rapid depletion of global fossil reserves has created a need to find sustainable monomers derived from biomaterials. By using bio-renewable feedstock, manufacturers can reduce their carbon footprint and move to a zero-carbon or even a carbon-neutral footprint. Bio-based polymers are also very attractive in terms of specific energy and emission savings. Using bio-based feedstock can decrease the amount of plastic targeted for landfills, help provide new sources of income for domestic agriculture, and reduce the economic risks and uncertainty associated with reliance on petroleum imported from unstable regions.

While known compositions and processes are suitable for their intended purposes, a need remains for improved resins and toner compositions. In addition, a need remains for resins and toners derived from sources other than petroleum and/or from renewable resources. Further, a need remains for resins and toners derived from sources other than bisphenol-A. Additionally, a need remains for toners having concurrent good fusing performance and good electrical performance. There is also a need for toners derived from relatively inexpensive sources. In addition, there is a need for emulsion aggregation toners having the aforementioned advantages. Further, there is a need for emulsion aggregation toners derived either from petroleum-based sources or from renewable resources that do not contain bisphenol-A and that can be obtained in high yield, have small particle size, have controlled particle morphology or shape, have a narrow particle size GSD, and have a core-shell structure.

SUMMARY

Disclosed herein is a polyester resin comprising the polycondensation product of: (a) at least one diacid, acid ester, or diester; and (b) at least one diol; wherein either (i) at least one diacid, acid ester, or diester comprises a rosin diacid, rosin acid ester, or rosin diester; or (ii) at least one diol comprises a rosin diol; and wherein at least one of the rosin diacid, rosin acid ester, rosin diester, or rosin diol is either (A) an ester of a functionalized rosin or an ester of a reduced functionalized rosin; or (B) a dimerized rosin. Also disclosed herein is a toner composition comprising particles which comprise: (1) a polyester resin comprising the polycondensation product of: (a) at least one diacid, acid ester, or diester; and (b) at least one diol; wherein either (i) at least one diacid, acid ester, or diester comprises a rosin diacid, rosin acid ester, or rosin diester; or (ii) at least one diol comprises a rosin diol; and wherein at least one of the rosin diacid, rosin acid ester, rosin diester, or rosin diol is either (A) an ester of a functionalized rosin or an ester of a reduced functionalized rosin; or (B) a dimerized rosin; and (2) an optional colorant. Further disclosed herein is a toner composition comprising particles which comprise: (1) an amorphous polyester resin comprising the polycondensation product of: (a) at least one diacid, acid ester, or diester; and (b) at least one diol; wherein either (i) at least one diacid, acid ester, or diester comprises a rosin diacid, rosin acid ester, or rosin diester; or (ii) at least one diol comprises a rosin diol; and wherein at least one of the rosin diacid, rosin acid ester, rosin diester, or rosin diol is either (A) an ester of a functionalized rosin or an ester of a reduced functionalized rosin; or (B) a dimerized rosin; and (2) a crystalline polyester resin; and (3) a colorant; wherein the toner is an emulsion aggregation toner.

DETAILED DESCRIPTION

Resins

Figure 1:
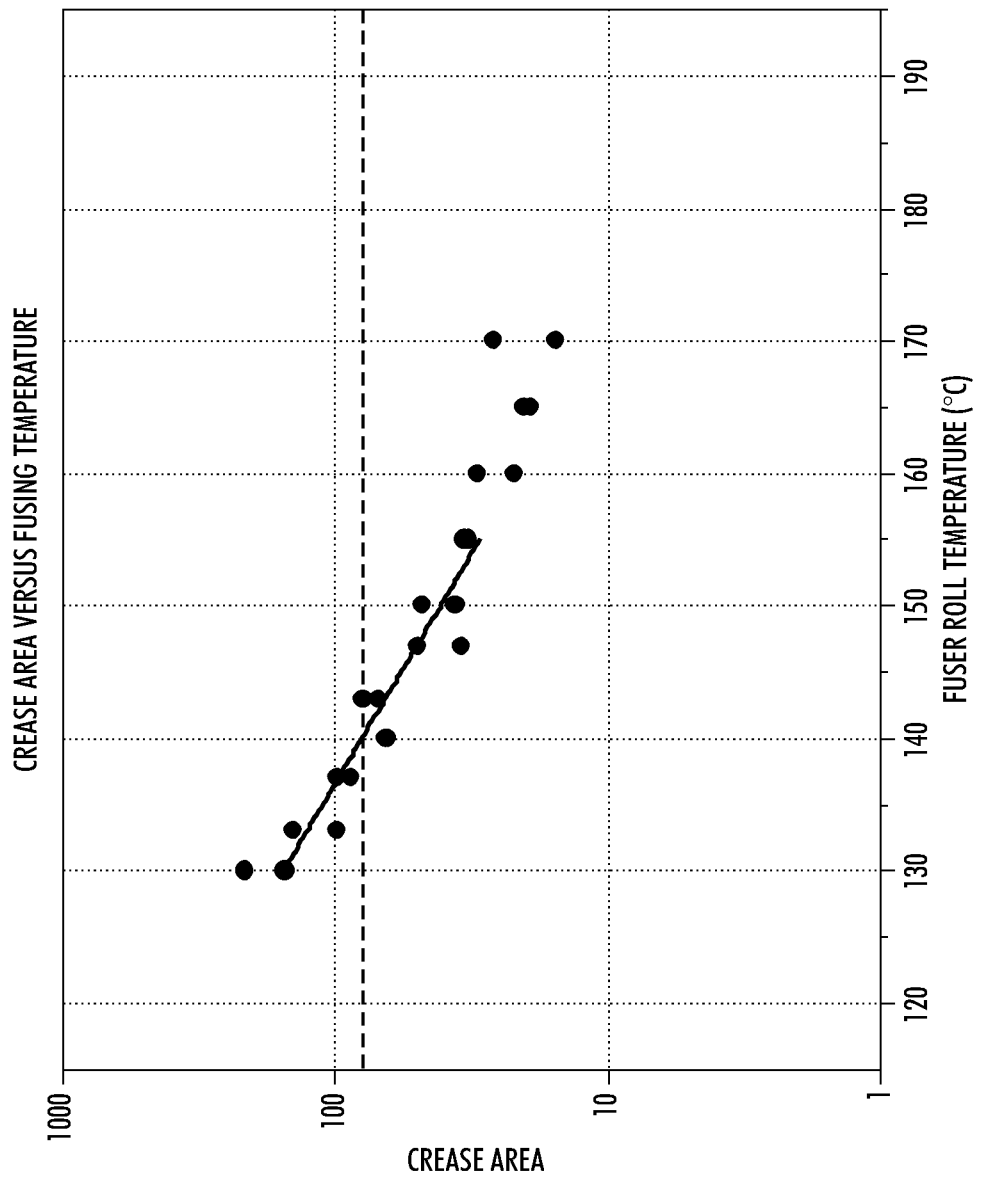
FIG. 1 is a curve representing the plot of crease as a function of temperature for the toner of Example IX.

The resins included in the toners disclosed herein are derived from rosin. Rosin is generally derived from conifers and other plants and comprises mixtures of organic acids such as abietic acid and related compounds and isomers, including (but not limited to) neoabietic acid, palustric acid, pimaric acid, levo-pimaric acid, isopimaric acid, dehydroabietic acid, sandaracopimaric acid, and the like:

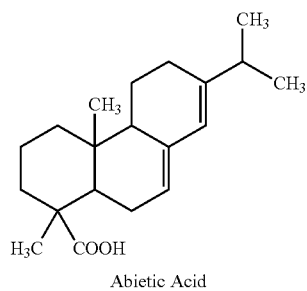
Abietic Acid

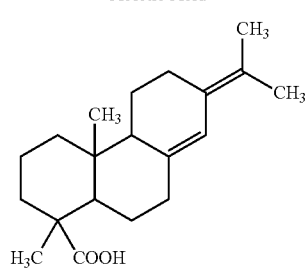
Neoabietic Acid

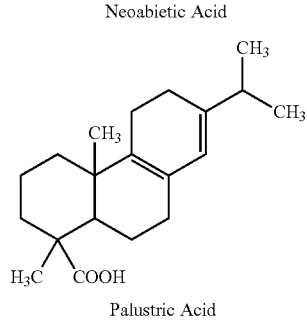
Palustric Acid

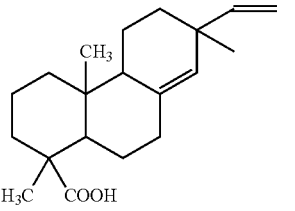
Pimaric Acid

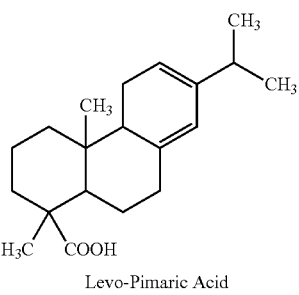
Levo-Pimaric Acid

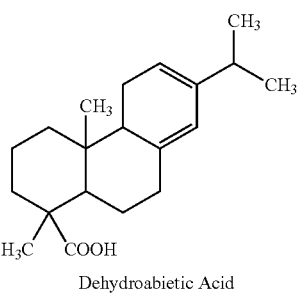
Isopimaric Acid

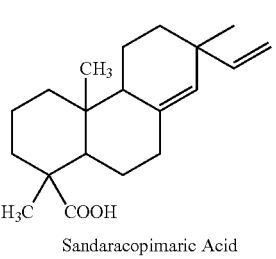
Dehydroabietic Acid

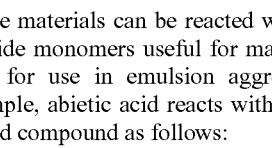
Sandaracopimaric Acid

These materials can be reacted with acids or anhydrides to provide monomers useful for making polyester resins suitable for use in emulsion aggregation (EA) toners. For example, abietic acid reacts with acrylic acid to generate a diacid compound as follows:

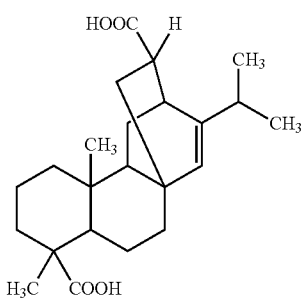

Acrylic Acid-Modified Abietic Acid with fumaric acid to generate a compound as follows:

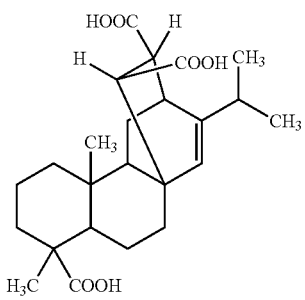

Fumaric Acid-Modified Abietic Acid and with maleic anhydride to generate a compound as follows:

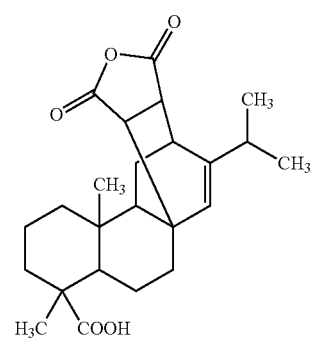

Maleic Anhydride-Modified Abietic Acid

Esters can also be formed of functionalized rosins. By "functionalized" is meant that the rosin has thereon a functional group or combination of functional groups that can undergo a polycondensation reaction with a diol to form a polyester, such as two or more carboxylic acid groups, two or more ester groups, one or more acid groups and one or more ester groups, one or more anhydride groups, or the like. The esters can be formed from various alcohols, such as monoalcohols of the formula $R_1$—OH wherein $R_1$ is (1) an alkyl group, including linear, branched, saturated, unsaturated, cyclic, substituted, and unsubstituted alkyl groups, and wherein hetero atoms, such as oxygen, nitrogen, sulfur, silicon, phosphorus, boron, and the like either may or may not be present in the alkyl group, in one embodiment with at least about 1 carbon atom, in another embodiment with at least about 4 carbon atoms, and in yet another embodiment with at least about 6 carbon atoms, and in one embodiment with no more than about 40 carbon atoms, in another embodiment with no more than about 22 carbon atoms, and in yet another embodiment with no more than about 12 carbon atoms, although the number of carbon atoms can be outside of these ranges, (2) an aryl group, including substituted and unsubstituted aryl groups, and wherein hetero atoms, such as oxygen, nitrogen, sulfur, silicon, phosphorus, boron, and the like either may or may not be present in the aryl group, in one embodiment with at least about 4 carbon atoms (in this instance at least one hetero atom would be present), in another embodiment with at least about 8 carbon atoms, and in yet another embodiment with at least about 12 carbon atoms, and in one embodiment with no more than about 40 carbon atoms, in another embodiment with no more than about 22 carbon atoms, and in yet another embodiment with no more than about 16 carbon atoms, although the number of carbon atoms can be outside of these ranges, such as phenyl or the like, (3) an arylalkyl group, including substituted and unsubstituted arylalkyl groups, wherein the alkyl portion of the arylalkyl group can be linear, branched, saturated, unsaturated, and/or cyclic, and wherein hetero atoms, such as oxygen, nitrogen, sulfur, silicon, phosphorus, boron, and the like either may or may not be present in either or both of the alkyl portion and the aryl portion of the arylalkyl group, in one embodiment with at least about 4 carbon atoms (in this instance at least one hetero atom would be present), in another embodiment with at least about 8 carbon atoms, and in yet another embodiment with at least about 10 carbon atoms, and in one embodiment with no more than about 40 carbon atoms, in another embodiment with no more than about 22 carbon atoms, and in yet another embodiment with no more than about 16 carbon atoms, although the number of carbon atoms can be outside of these ranges, such as benzyl or the like, or (4) an alkylaryl group, including substituted and unsubstituted alkylaryl groups, wherein the alkyl portion of the alkylaryl group can be linear, branched, saturated, unsaturated, and/or cyclic, and wherein hetero atoms, such as oxygen, nitrogen, sulfur, silicon, phosphorus, boron, and the like either may or may not be present in either or both of the alkyl portion and the aryl portion of the alkylaryl group, in one embodiment with at least about 4 carbon atoms (in this instance at least one hetero atom would be present), in another embodiment with at least about 8 carbon atoms, and in yet another embodiment with at least about 10 carbon atoms, and in one embodiment with no more than about 40 carbon atoms, in another embodiment with no more than about 22 carbon atoms, and in yet another embodiment with no more than about 16 carbon atoms, although the number of carbon atoms can be outside of these ranges, such as tolyl or the like; such as methanol, ethanol, isopropanol, n-propanol, n-butanol, isobutanol, sec-butanol, tert-butanol, and the like; diols, of the formula HO—$R_2$—OH, wherein $R_2$ is (1) an alkylene group, including linear, branched, saturated, unsaturated, cyclic, substituted, and unsubstituted alkylene groups, and wherein hetero atoms, such as oxygen, nitrogen, sulfur, silicon, phosphorus, boron, and the like either may or may not be present in the alkylene group, in one embodiment with at least about 1 carbon atom, in another embodiment with at least about 4 carbon atoms, and in yet another embodiment with at least about 6 carbon atoms, and in one embodiment with no more than about 40 carbon atoms, in another embodiment with no more than about 22 carbon atoms, and in yet another embodiment with no more than about 12 carbon atoms, although the number of carbon atoms can be outside of these ranges, (2) an arylene group, including substituted and unsubstituted arylene groups, and wherein hetero atoms, such as oxygen, nitrogen, sulfur, silicon, phosphorus, boron, and the like either may or may not be present in the arylene group, in one embodiment with at least about 4 carbon atoms (in this instance at least one hetero atom would be present), in another embodiment with at least about 8 carbon atoms, and in yet another embodiment with at least about 12 carbon atoms, and in one embodiment with no more than about 40 carbon atoms, in another embodiment with no more than about 22 carbon atoms, and in yet another embodiment with no more than about 16 carbon atoms, although the number of carbon atoms can be outside of these ranges, such as phenylene or the like, (3) an arylalkylene group, including substituted and unsubstituted arylalkylene groups, wherein the alkyl portion of the arylalkylene group can be linear, branched, saturated, unsaturated, and/or cyclic, and wherein hetero atoms, such as oxygen, nitrogen, sulfur, silicon, phosphorus, boron, and the like either may or may not be present in either or both of the alkyl portion and the aryl portion of the arylalkylene group, in one embodiment with at least about 4 carbon atoms (in this instance at least one hetero atom would be present), in another embodiment with at least about 8 carbon atoms, and in yet another embodiment with at least about 10 carbon atoms, and in one embodiment with no more than about 40 carbon atoms, in another embodiment with no more than about 22 carbon atoms, and in yet another embodiment with no more than about 16 carbon atoms, although the number of carbon atoms can be outside of these ranges, such as benzylene or the like, or (4) an alkylarylene group, including substituted and unsubstituted alkylarylene groups, wherein the alkyl portion of the alkylarylene group can be linear, branched, saturated, unsaturated, and/or cyclic, and wherein hetero atoms, such as oxygen, nitrogen, sulfur, silicon, phosphorus, boron, and the like either may or may not be present in either or both of the alkyl portion and the aryl portion of the alkylarylene group, in one embodiment with at least about 4 carbon atoms (in this instance at least one hetero atom would be present), in another embodiment with at least about 8 carbon atoms, and in yet another embodiment with at least about 10 carbon atoms, and in one embodiment with no more than about 40 carbon atoms, in another embodiment with no more than about 22 carbon atoms, and in yet another embodiment with no more than about 16 carbon atoms, although the number of carbon atoms can be outside of these ranges, such as tolylene or the like; such as triethylene glycol, dipropylene glycol, ethylene glycol, diethylene glycol, other alkylene glycols such as propylene glycol, 1,3- and 1,4-butanediols, 1,6-hexanediol, 3-methyl-1,5-pentanediol, neopentyl glycol, and the like; triols, of the formula $R_3$—$(OH)_3$, wherein $R_3$ is (1) an alkylene group, including linear, branched, saturated, unsaturated, cyclic, substituted, and unsubstituted alkylene groups, and wherein hetero atoms, such as oxygen, nitrogen, sulfur, silicon, phosphorus, boron, and the like either may or may not be present in the alkylene group, in one embodiment with at least about 1 carbon atom, in another embodiment with at least about 4 carbon atoms, and in yet another embodiment with at least about 6 carbon atoms, and in one embodiment with no more than about 40 carbon atoms, in another embodiment with no more than about 22 carbon atoms, and in yet another embodiment with no more than about 12 carbon atoms, although the number of carbon atoms can be outside of these ranges, (2) an arylene group, including substituted and unsubstituted arylene groups, and wherein hetero atoms, such as oxygen, nitrogen, sulfur, silicon, phosphorus, boron, and the like either may or may not be present in the arylene group, in one embodiment with at least about 4 carbon atoms (in this instance at least one hetero atom would be present), in another embodiment with at least about 8 carbon atoms, and in yet another embodiment with at least about 12 carbon atoms, and in one embodiment with no more than about 40 carbon atoms, in another embodiment with no more than about 22 carbon atoms, and in yet another embodiment with no more than about 12 carbon atoms, although the number of carbon atoms can be outside of these ranges, such as phenylene or the like, (3) an arylalkylene group, including substituted and unsubstituted arylalkylene groups, wherein the alkyl portion of the arylalkylene group can be linear, branched, saturated, unsaturated, and/or cyclic, and wherein hetero atoms, such as oxygen, nitrogen, sulfur, silicon, phosphorus, boron, and the like either may or may not be present in either or both of the alkyl portion and the aryl portion of the arylalkylene group, in one embodiment with at least about 4 carbon atoms (in this instance at least one hetero atom would be present), in another embodiment with at least about 8 carbon atoms, and in yet another embodiment with at least about 10 carbon atoms, and in one embodiment with no more than about 40 carbon atoms, in another embodiment with no more than about 22 carbon atoms, and in yet another embodiment with no more than about 16 carbon atoms, although the number of carbon atoms can be outside of these ranges, such as benzylene or the like, or (4) an alkylarylene group, including substituted and unsubstituted alkylarylene groups, wherein the alkyl portion of the alkylarylene group can be linear, branched, saturated, unsaturated, and/or cyclic, and wherein hetero atoms, such as oxygen, nitrogen, sulfur, silicon, phosphorus, boron, and the like either may or may not be present in either or both of the alkyl portion and the aryl portion of the alkylarylene group, in one embodiment with at least about 4 carbon atoms (in this instance at least one hetero atom would be present), in another embodiment with at least about 8 carbon atoms, and in yet another embodiment with at least about 12 carbon atoms, and in one embodiment with no more than about 40 carbon atoms, in another embodiment with no more than about 22 carbon atoms, and in yet another embodiment with no more than about 16 carbon atoms, although the number of carbon atoms can be outside of these ranges, such as tolylene or the like; such as glycerol, trimethylolpropane, trimethylolethane, hexane triols, and the like; tetrols, of the formula $R_4$—$(OH)_4$, wherein $R_4$ is (1) an alkylene group, including linear, branched, saturated, unsaturated, cyclic, substituted, and unsubstituted alkylene groups, and wherein hetero atoms, such as oxygen, nitrogen, sulfur, silicon, phosphorus, boron, and the like either may or may not be present in the alkylene group, in one embodiment with at least about 1 carbon atom, in another embodiment with at least about 4 carbon atoms, and in yet another embodiment with at least about 6 carbon atoms, and in one embodiment with no more than about 40 carbon atoms, in another embodiment with no more than about 22 carbon atoms, and in yet another embodiment with no more than about 12 carbon atoms, although the number of carbon atoms can be outside of these ranges, (2) an arylene group, including substituted and unsubstituted arylene groups, and wherein hetero atoms, such as oxygen, nitrogen, sulfur, silicon, phosphorus, boron, and the like either may or may not be present in the arylene group, in one embodiment with at least about 4 carbon atoms (in this instance at least one hetero atom would be present), in another embodiment with at least about 8 carbon atoms, and in yet another embodiment with at least about 12 carbon atoms, and in one embodiment with no more than about 40 carbon atoms, in another embodiment with no more than about 22 carbon atoms, and in yet another embodiment with no more than about 12 carbon atoms, although the number of carbon atoms can be outside of these ranges, such as phenylene or the like, (3) an arylalkylene group, including substituted and unsubstituted arylalkylene groups, wherein the alkyl portion of the arylalkylene group can be linear, branched, saturated, unsaturated, and/or cyclic, and wherein hetero atoms, such as oxygen, nitrogen, sulfur, silicon, phosphorus, boron, and the like either may or may not be present in either or both of the alkyl portion and the aryl portion of the arylalkylene group, in one embodiment with at least about 4 carbon atoms (in this instance at least one hetero atom would be present), in another embodiment with at least about 8 carbon atoms, and in yet another embodiment with at least about 10 carbon atoms, and in one embodiment with no more than about 40 carbon atoms, in another embodiment with no more than about 22 carbon atoms, and in yet another embodiment with no more than about 16 carbon atoms, although the number of carbon atoms can be outside of these ranges, such as benzylene or the like, or (4) an alkylarylene group, including substituted and unsubstituted alkylarylene groups, wherein the alkyl portion of the alkylarylene group can be linear, branched, saturated, unsaturated, and/or cyclic, and wherein hetero atoms, such as oxygen, nitrogen, sulfur, silicon, phosphorus, boron, and the like either may or may not be present in either or both of the alkyl portion and the aryl portion of the alkylarylene group, in one embodiment with at least about 4 carbon atoms (in this instance at least one hetero atom would be present), in another embodiment with at least about 8 carbon atoms, and in yet another embodiment with at least about 12 carbon atoms, and in one embodiment with no more than about 40 carbon atoms, in another embodiment with no more than about 22 carbon atoms, and in yet another embodiment with no more than about 16 carbon atoms, although the number of carbon atoms can be outside of these ranges, such as tolylene or the like; such as pentaerythritol, alpha-methylglucoside, diglycerol, and the like, wherein the substituents on the substituted alkyl, alkylene, aryl, arylene, arylalkyl, arylalkylene, alkylaryl, and alkylarylene groups can be (but are not limited to)hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, silyl groups, siloxyl groups, silane groups, mixtures thereof, and the like, wherein two or more substituents can be joined together to form a ring. Examples of suitable esters are of the following general formulae:

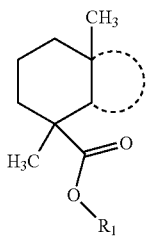

ester derived from monoalcohol with a specific example including the ester derived from methanol, of the formula

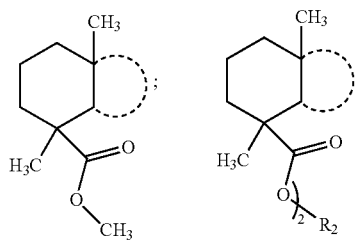

ester derived from diol with specific examples including the ester derived from glycerol when only two of the three —OH groups are substituted:

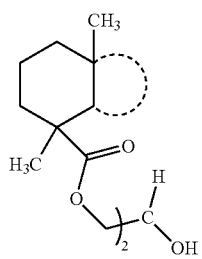

and the ester derived from triethylene glycol:

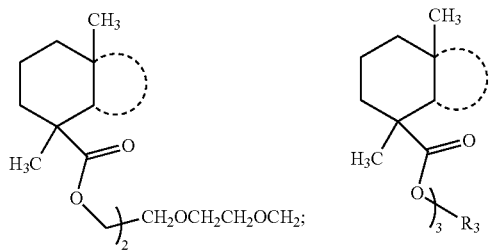

ester derived from triol with a specific example including the ester derived from glycerol when all three of the three —OH groups are substituted:

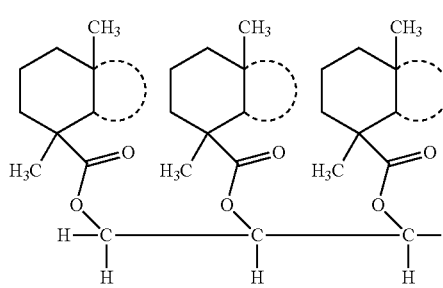

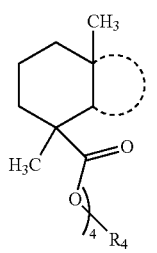

ester derived from tetrol with a specific example including the ester derived from pentaerythritol:

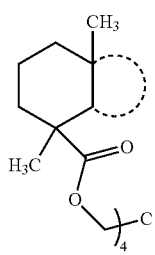

wherein the dotted arc

represents generically the remainder of a functionalized rosin. For example, in the case of acrylic acid-modified abietic acid, of the formula

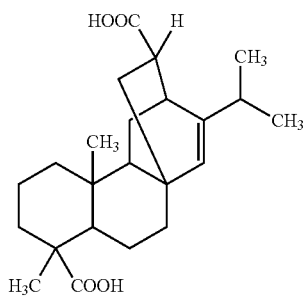

Acrylic Acid-Modified Abietic Acid the dotted arc represents the following moiety:

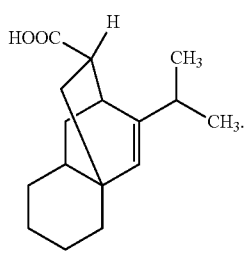

For example, the pentaerythritol ester of maleic anhydride-modified rosin, of the formula

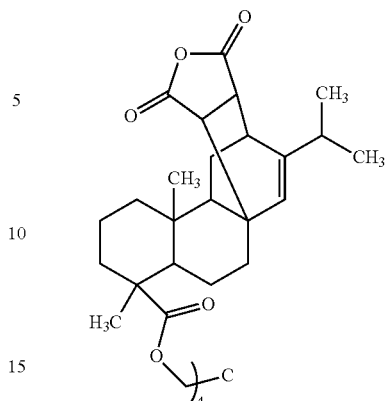

Pentaerythritol Ester of Maleic
Anhydride-Modified Rosin is available from Pinova, Inc. as PENTALYN FC, and the glycerol ester of maleic anhydride-modified rosin, of the formula

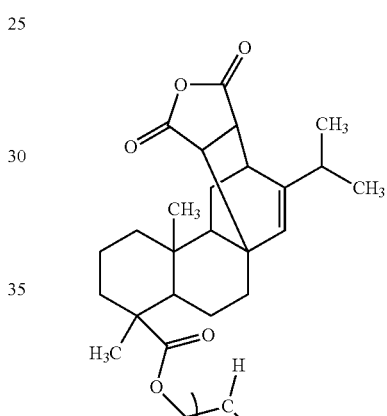

Glycerol Ester of Maleic
Anhydride-Modified Rosin is available from Eastman Chemical Co. as LEWISOL 28. These compounds can also be made by the reaction of the anhydride-modified resin with the alcohol. The reaction is an equilibrium reaction which is driven to near completion, although there will always be some unreacted acidic and hydroxyl groups. Further details on this reaction are described in, for example, Wang, "Synthesis of Light-Colored Rosin Glycerol Ester," *Holzforschung—International Journal of the Biology, Chemistry, Physics and Technology of Wood*, 61(5), pp. 499-503 (2007), the disclosure of which is totally incorporated herein by reference.

Further, rosins can be dimerized with or without functionalization to provide materials having two or more carboxylic acid groups thereon. Dimerized rosins are also often referred to in the art as polymerized rosins, although "polymerized rosin" also typically refers to the resinous mixture comprising unrefined reaction products containing non-dimerizable rosin acids such as dehydroabietic acid, rosin acids containing some unsaturation which do not react, a number of different types of polymerized rosin acids including dimerized rosin acids, esters, rosin acid anhydrides, and non-saponifiable substances. Dimerized or polymerized rosins can be made as described in, for example, U.S. Pat. Nos. 2,017,866, 2,108, 928, 2,136,525, 2,307,641, 2,322,316, 2,328,681, 2,375,618, 2,492,146, 2,515,218, 4,414,146, and 4,536,333, and in Parkin, Jr. et al., "Thermal Dimerization of Rosin," *Ind. Eng. Chem. Prod. Res. Dev.,* 8(3), pp. 304-306 (1969), Sinclair et al., "Influence of Reaction Conditions on the Dimerization of Abietic Acid and Rosin," *Ind. Eng. Chem. Prod. Res. Dev.,* 9(1), pp. 60-65 (1970), and Fujii et al., "Dimeric Components from the Dimerization of Abietic Acid," *JAOCS,* 64(8), pp. 1144-1149 (1987), the disclosures of each of which are totally incorporated herein by reference. Dimerized rosin is believed to have a number of different structures, as in, for example, the following compound

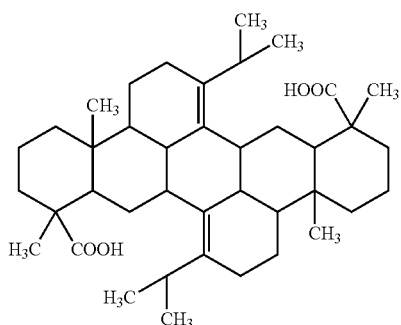

Dimerized Rosin available as DYMEREX from Eastman Chemical Co., as well as the following other proposed structures:

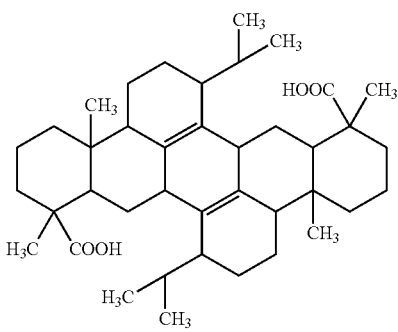

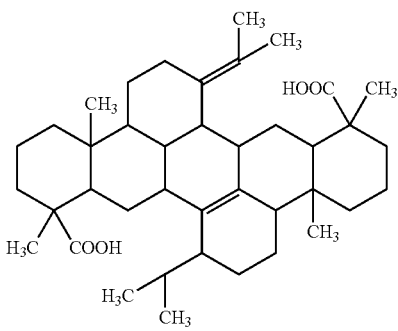

-continued

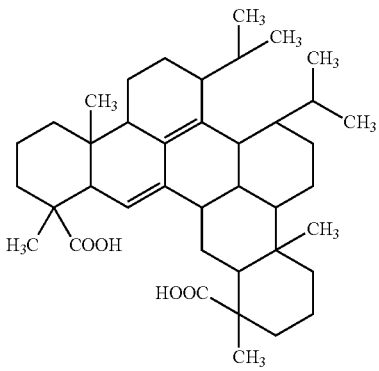

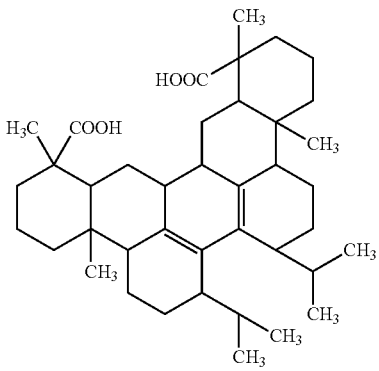

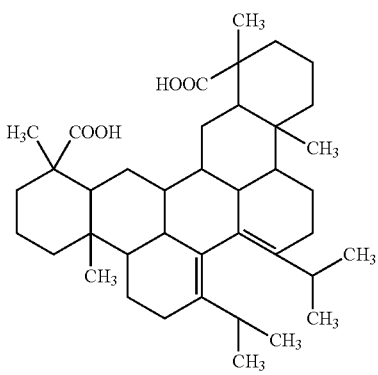

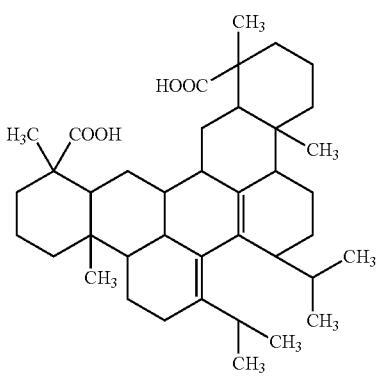

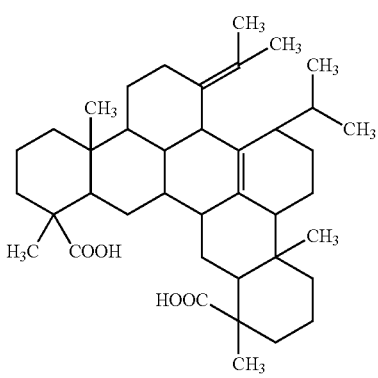

and the like, and all dimerized rosins are suitable for the purposes of the present disclosure.

For the purposes of the present disclosure, the term "diacid" is to be understood to include compounds with two or more carboxylic acid groups, such as triacids and the like, as well as compounds having anhydride functional groups thereon, since anhydride groups convert to diacid groups under polycondensation reaction conditions. Similarly, for purposes of the present disclosure, the term "diester" is to be understood to include compounds with two or more ester groups, such as triesters and the like. Other examples of suitable acids that can be reacted with the rosin acids to generate rosin diacids include (but are not limited to) maleic acid, fumaric acid, itaconic acid, and the like, as well as mixtures thereof. Other examples of suitable anhydrides that can be reacted with the rosin acids include (but are not limited to) maleic anhydride, fumaric anhydride, itaconic anhydride, and the like, as well as mixtures thereof.

The reaction conditions between the rosin acids and the acids and anhydrides are known in the art and are described in, for example, "Preparation of Acrylic Modified Rosin," Noah J. Halbrook and Ray V. Lawrence, *Ind. Eng. Chem. Prod. Res. Develop.*, Vol. 11, No. 2, p. 200-202, 1972, "Fumaric Modified Resin," Noah J. Halbrook and Ray V. Lawrence, *Industrial and Engineering Chemistry*, Vol. 50, No. 3, March 1958, pp. 321-322, and "Rosin-based acid anhydrides as alternatives to petrochemical curing agents," Xiaoqing Liu, Wenbo Xin, and Jinwen Zhang, *Green Chem.*, 2009, 11, 1018-1025, the disclosures of each of which are totally incorporated herein by reference.

The rosin thus modified is then reacted with a diol in the presence of an optional catalyst to form a polyester. For the purposes of the present disclosure, the term "diol" is intended to include compounds with two or more alcoholic functional groups, including triols and the like. Examples of suitable diols include, but are not limited to, 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, bis(hydroxyethyl)-bisphenol A, bis(2-hydroxypropyl)-bisphenol A, 1,4-cyclohexanedimethanol, 1,3-cyclohexanedimethanol, xylenedimethanol, cyclohexanediol, diethylene glycol, bis(2-hydroxyethyl)oxide, dipropylene glycol, dibutylene glycol, 2,2-dimethylpropanediol, 2,2,3-trimethylhexanediol, bis(2-hydroxyethyl)oxide, combinations thereof, and the like. The diol can be selected in any desired or effective amount, in one embodiment at least about 40 mole percent, in another embodiment at least about 42 mole percent and in yet another embodiment at least about 45 mole percent, and in one embodiment no more than about 60 mole percent, in another embodiment no more than about 55 mole percent, and in yet another embodiment no more than about 53 mole percent, and the alkali sulfo-aliphatic diol can be selected in any desired or effective amount, in one embodiment 0 mole percent, and in another embodiment no more than about 1 mole percent, and in one embodiment no more than about 10 mole percent, and in another embodiment no more than from about 4 mole percent of the resin, although the amounts can be outside of these ranges.

In addition, in one specific embodiment, rosin acids that have been reacted with acids to form diacids or triacids can be reduced to the corresponding rosin diols or triols and used in the reaction:

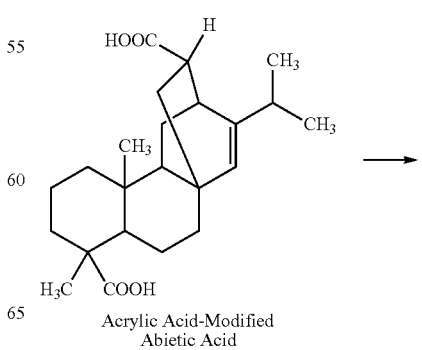

Acrylic Acid-Modified
Abietic Acid

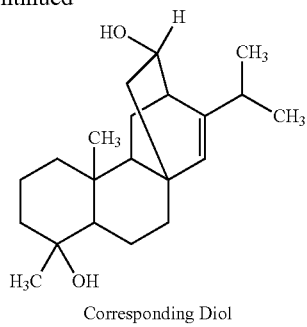

Corresponding Diol

The reaction can be carried out using known reduction methods with hydrogen and a platinum catalyst or by reduction with a reducing agent such as lithium aluminum hydride. This reaction will also reduce anhydride-substituted rosins to diols. For the purposes of the present disclosure, the term "ester of a reduced functionalized rosin" will be used to refer to compounds of the formulae

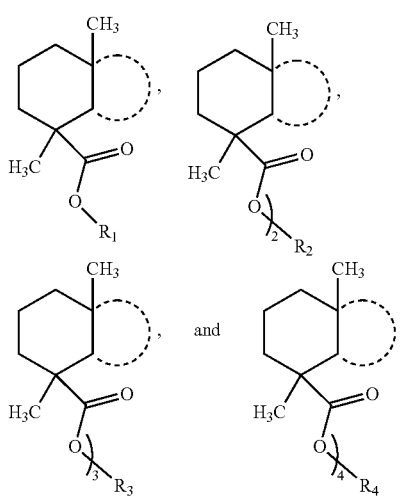

wherein acid and/or anhydride substituents on the compounds have been reduced to hydroxyl groups. Ester groups can be converted into primary alcohol groups by hydrogenation of the methyl ester of rosin at 300° C. and 34.5 kPa in the presence of a copper chromite catalyst. A commercially available alcohol is ABITOL technical hydroabietyl alcohol, which is a high molecular weight primary alcohol having a typical hydroabietyl alcohol content of 83% and a degree of unsaturation expressed as 0.71 gram of hydrogen absorbed per 100 grams of ABITOL technical hydroabietyl alcohol. A discussion of the nature and chemistry of rosin and rosin derivatives, including techniques for hydrogenating and esterifying rosin, can be found in the *Encyclopedia of Chemical Technology*, $2^{nd}$ Edition, 1968, Vol. 17, pp. 476-507, the disclosure of which is totally incorporated herein by reference.

Further, in one specific embodiment, the diol is selected to be non-petroleum based, so that the resulting polyester is derived from renewable resources. Products can be tested for whether they are sourced from petroleum or from renewable resources by $^{14}C$ radiocarbon dating. Products sourced from petroleum will have substantially high $^{14}C$ radiocarbon dating values, in the millions of years, compared to very recent or present day radiocarbon values for those products derived from renewable resources. Examples of such diols include (but are not limited to) 1,2-propanediol, 1,3-propanediol, propylene glycol, dimer diol, such as PRIPOL® 2033, a C-36 dimer diol mixture including isomers of the formula

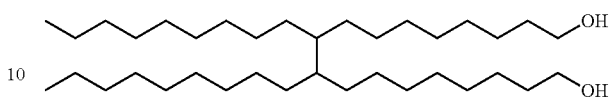

as well as other branched isomers which can include unsaturations and cyclic groups, available from Uniqema, New Castle, Del. (further information on C36 dimer diols is disclosed in, for example, "Dimer Acids," *Kirk-Othmer Encyclopedia of Chemical Technology*, Vol. 8, 4th Ed. (1992), pp. 223 to 237, the disclosure of which is totally incorporated herein by reference), 1,4:3,6-dianhydro-D-sorbitol, also referred to as isosorbide, of the formula

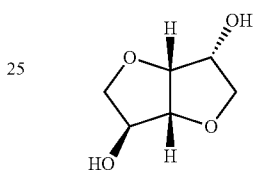

which can be prepared as disclosed in, for example, Fleche et al., *Starch/Starke*, 38(1), pp. 26-30 (1986), and Ballauff et al., Polyesters (Derived from Renewable Sources), *Polymeric Materials Encyclopedia*, Vol. 8, p. 5892 (1996), the disclosures of each of which are totally incorporated herein by reference, and the like, as well as mixtures thereof.

Corresponding acid esters or diesters of the rosin diacids can also be used to react with diols. One or both of the carboxylic acid groups can be replaced with ester groups prior to the reaction. Reaction conditions to generate rosin-based acid esters are disclosed in, for example, "Rosin-based acid anhydrides as alternatives to petrochemical curing agents," Xiaoqing Liu, Wenbo Xin, and Jinwen Zhang, *Green Chem.*, 2009, 11, 1018-1025, the disclosure of which is totally incorporated herein by reference.

The rosin diacid, rosin acid ester, or rosin diester monomers can also be admixed with other diacid, acid-ester, or diester monomers to form copolymers thereof when reacted with diols. Examples of suitable organic diacids or diesters include, but are not limited to, terephthalic acid, phthalic acid, isophthalic acid, fumaric acid, maleic acid, succinic acid, itaconic acid, succinic acid, succinic anhydride, dodecylsuccinic acid, dodecylsuccinic anhydride, glutaric acid, glutaric anhydride, adipic acid, pimelic acid, suberic acid, azelaic acid, dodecanediacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate, and the like, as well as mixtures thereof.

In one specific embodiment, the other diacid or diester monomers are selected to be non-petroleum based, so that the resulting polyester is derived from renewable resources. Examples of such monomers include (but are not limited to) succinic acid, azelaic acid, citric acid, esters or anhydrides thereof, and the like, as well as mixtures thereof.

The diacid can be selected in any desired or effective amount, in one embodiment at least about 40 mole percent, in another embodiment at least about 42 mole percent, and in yet another embodiment at least about 45 mole percent, and in one embodiment no more than about 60 mole percent, in another embodiment no more than about 55 mole percent, and in yet another embodiment no more than about 53 mole percent, although the amounts can be outside of these ranges.

Polycondensation catalysts which can be used for preparation of either crystalline or amorphous polyesters include, but are not limited to, tetraalkyl titanates such as titanium (iv) butoxide or titanium (iv) iso-propoxide, dialkyltin oxides such as dibutyltin oxide, tetraalkyltins such as dibutyltin dilaurate, dialkyltin oxide hydroxides such as butyltin oxide hydroxide, aluminum alkoxides, alkyl zinc, dialkyl zinc, zinc oxide, stannous oxide, and the like, as well as mixtures thereof. Such catalysts can be used in any desired or effective amount, in one embodiment at least about 0.001 mole percent, and in one embodiment no more than about 5 mole percent based on the starting diacid or diester used to generate the polyester resin, although the amounts can be outside of these ranges.

The polyester resin prepared from the rosin acids or esters in specific embodiments can have a softening point (Ts) in one embodiment of at least about 100° C., in another embodiment at least about 105° C., and in yet another embodiment at least about 110° C., and in one embodiment no more than about 150° C., in another embodiment no more than about 140° C., and in yet another embodiment no more than about 135° C., although the temperature can be outside of these ranges.

The polyester resin prepared from the rosin acids or esters in specific embodiments can have a glass transition point (Tg) in one embodiment of at least about 45° C., in another embodiment at least about 50° C., and in yet another embodiment at least about 65° C., and in one embodiment no more than about 70° C., in another embodiment no more than about 66° C., and in yet another embodiment no more than about 65° C., although the temperature can be outside of these ranges.

The polyester resin prepared from the rosin acids or esters in specific embodiments can have an acid value in one embodiment of at least about 2 mgKOH/g, in another embodiment of at least about 10 mgKOH/g, and in yet another embodiment of at least about 20 mgKOH/g, and in one embodiment of no more than about 100 mgKOH/g, in another embodiment of no more than about 60 mgKOH/g, and in yet another embodiment of no more than about 50 mgKOH/g, although the value can be outside of these ranges.

The polyester resin prepared from the rosin acids or esters can have a number average molecular weight ($M_n$), as measured by gel permeation chromatography (GPC) of in one embodiment at least about 1,000, and in another embodiment at least about 2,000, and in one embodiment no more than about 50,000, and in another embodiment no more than about 25,000, and a weight average molecular weight ($M_w$) of in one embodiment at least about 2,000, and in another embodiment at least about 3,000, and in one embodiment no more than about 300,000, and in another embodiment no more than about 14,000, as determined by GPC using polystyrene standards, although the $M_n$ and $M_w$ values can be outside of these ranges. The molecular weight distribution ($M_w/M_n$) of the polyester resin can be in one embodiment at least about 1, and in another embodiment at least about 1.5, and in one embodiment no more than about 20, and in another embodiment no more than about 4, although the value can be outside of these ranges.

The polyester resin prepared from the rosin acids or esters can have a carbon to oxygen ratio (C/O) of in one embodiment at least than about 1.5, in another embodiment at least about 2.5, in yet another embodiment at least about 3.5, and in still another embodiment at least about 4.0, and in one embodiment no more than about 6.0, in another embodiment no more than about 5.0, in yet another embodiment no more than about 4.7, and in still another embodiment no more than about 4.5, although the value can be outside of these ranges. Carbon to oxygen ratio can be calculated as follows:

$$C/O = \Sigma(C_i/O_i)$$

wherein C/O is the carbon to oxygen ratio, $C_i$ is the sum of carbon atoms present in the resin, and $O_i$ is the sum of oxygen atoms present in the resin.

When preparing the toners, the polyester resins prepared from the rosin acids or esters, if desired, can be used in combination with other polyester resins, including, if necessary, those derived from petroleum sources. Examples of other suitable polyester resins include, but are not limited to, sulfonated, non-sulfonated, crystalline, amorphous, combinations thereof, and the like. The polyester resins can be linear, branched, combinations thereof, and the like. Polyester resins can include those resins disclosed in U.S. Pat. Nos. 6,593,049 and 6,756,176, the disclosures of each of which are totally incorporated herein by reference. Suitable resins also include mixtures of amorphous polyester resins and crystalline polyester resins as disclosed in U.S. Pat. No. 6,830,860, the disclosure of which is totally incorporated herein by reference.

Other examples of suitable polyesters include those formed by reacting a diol with a diacid or diester in the presence of an optional catalyst. For forming a crystalline polyester, suitable organic diols include, but are not limited to, aliphatic diols with from about 2 to about 36 carbon atoms, such as 1,2-ethanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol, ethylene glycol, combinations thereof, and the like. The aliphatic diol can be selected in any desired or effective amount, in one embodiment at least about 40 mole percent, in another embodiment at least about 42 mole percent and in yet another embodiment at least about 45 mole percent, and in one embodiment no more than about 60 mole percent, in another embodiment no more than about 55 mole percent, and in yet another embodiment no more than about 53 mole percent, and the alkali sulfo-aliphatic diol can be selected in any desired or effective amount, in one embodiment 0 mole percent, and in another embodiment no more than about 1 mole percent, and in one embodiment no more than about 10 mole percent, and in another embodiment no more than from about 4 mole percent of the resin, although the amounts can be outside of these ranges.

Examples of suitable organic diacids or diesters for preparation of crystalline resins include, but are not limited to, oxalic acid, succinic acid, glutaric acid, adipic acid, suberic acid, azelaic acid, fumaric acid, maleic acid, dodecanedioic acid, sebacic acid, phthalic acid, isophthalic acid, terephthalic acid, naphthalene-2,6-dicarboxylic acid, naphthalene-2,7-dicarboxylic acid, cyclohexane dicarboxylic acid, malonic acid and mesaconic acid, a diester or anhydride thereof, and the like, as well as combinations thereof. The organic diacid can be selected in any desired or effective amount, in one embodiment at least about 40 mole percent, in another embodiment at least about 42 mole percent, and in yet another embodiment at least about 45 mole percent, and in one embodiment no more than about 60 mole percent, in another embodiment no more than about 55 mole percent, and in yet another embodiment no more than about 53 mole percent, although the amounts can be outside of these ranges.

Examples of suitable crystalline resins include, but are not limited to, polyesters, polyamides, polyimides, polyolefins, polyethylene, polybutylene, polyisobutyrate, ethylene-propylene copolymers, ethylene-vinyl acetate copolymers, polypropylene, and the like, as well as mixtures thereof. Specific crystalline resins can be polyester based, such as poly(ethylene-adipate), poly(propylene-adipate), poly(butylene-adipate), poly(pentylene-adipate), poly(hexylene-adipate), poly(octylene-adipate), poly(ethylene-succinate), poly(propylene-succinate), poly(butylene-succinate), poly(pentylene-succinate), poly(hexylene-succinate), poly(octylene-succinate), poly(ethylene-sebacate), poly(propylene-sebacate), poly(butylene-sebacate), poly(pentylene-sebacate), poly(hexylene-sebacate), poly(octylene-sebacate), alkali copoly(5-sulfoisophthaloyl)-copoly(ethylene-adipate), poly(decylene-sebacate), poly(decylene-decanoate), poly-(ethylene-decanoate), poly-(ethylene-dodecanoate), poly(nonylene-sebacate), poly(nonylene-decanoate), copoly(ethylene-fumarate)-copoly(ethylene-sebacate), copoly(ethylene-fumarate)-copoly(ethylene-decanoate), copoly(ethylene-fumarate)-copoly(ethylene-dodecanoate), and the like, as well as mixtures thereof. The crystalline resin can be present in any desired or effective amount, in one embodiment at least about 5 percent by weight of the toner components, and in another embodiment at least about 10 percent by weight of the toner components, and in one embodiment no more than about 50 percent by weight of the toner components, and in another embodiment no more than about 35 percent by weight of the toner components, although the amounts can be outside of these ranges. The crystalline resin can possess any desired or effective melting point, in one embodiment at least about 30° C., and in another embodiment at least about 50° C., and in one embodiment no more than about 120° C., and in another embodiment no more than about 90° C., although the melting point can be outside of these ranges. The crystalline resin can have any desired or effective number average molecular weight (Mn), as measured by gel permeation chromatography (GPC), in one embodiment at least about 1,000, in another embodiment at least about 2,000, and in one embodiment no more than about 50,000, and in another embodiment no more than about 25,000, although the Mn can be outside of these ranges, and any desired or effective weight average molecular weight (Mw), in one embodiment at least about 2,000, and in another embodiment at least about 3,000, and in one embodiment no more than about 100,000, and in another embodiment no more than about 80,000, although the Mw can be outside of these ranges, as determined by Gel Permeation Chromatography using polystyrene standards. The molecular weight distribution (Mw/Mn) of the crystalline resin can be of any desired or effective number, in one embodiment at least about 2, and in another embodiment at least about 3, and in one embodiment no more than about 6, and in another embodiment no more than about 4, although the molecular weight distribution can be outside of these ranges.

Examples of suitable diacid or diesters for preparation of amorphous polyesters include, but are not limited to, dicarboxylic acids, anhydrides, or diesters, such as terephthalic acid, phthalic acid, isophthalic acid, fumaric acid, maleic acid, succinic acid, itaconic acid, succinic acid, succinic anhydride, dodecylsuccinic acid, dodecylsuccinic anhydride, glutaric acid, glutaric anhydride, adipic acid, pimelic acid, suberic acid, azelaic acid, dodecanediacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate, and the like, as well as mixtures thereof. The organic diacid or diester can be present in any desired or effective amount, in one embodiment at least about 40 mole percent, in another embodiment at least about 42 mole percent, and in yet another embodiment at least about 45 mole percent, and in one embodiment no more than about 60 mole percent, in another embodiment no more than about 55 mole percent, and in yet another embodiment no more than about 53 mole percent of the resin, although the amounts can be outside of these ranges.

Examples of suitable diols for generating amorphous polyesters include, but are not limited to, 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, 1,4-cyclohexanedimethanol, 1,3-cyclohexanedimethanol, xylenedimethanol, cyclohexanediol, diethylene glycol, bis(2-hydroxyethyl) oxide, dipropylene glycol, dibutylene, and the like, as well as mixtures thereof. The organic diol can be present in any desired or effective amount, in one embodiment at least about 40 mole percent, in another embodiment at least about 42 mole percent, and in yet another embodiment at least about 45 mole percent, and in one embodiment no more than about 60 mole percent, in another embodiment no more than about 55 mole percent, and in yet another embodiment no more than about 53 mole percent of the resin, although the amounts can be outside of these ranges.

Examples of suitable amorphous resins include polyesters, polyamides, polyimides, polyolefins, polyethylene, polybutylene, polyisobutyrate, ethylene-propylene copolymers, ethylene-vinyl acetate copolymers, polypropylene, and the like, as well as mixtures thereof.

Suitable crystalline resins also include those disclosed in U.S. Pat. No. 7,329,476, the disclosure of which is totally incorporated herein by reference. One specific suitable crystalline resin comprises ethylene glycol and a mixture of dodecanedioic acid and fumaric acid co-monomers with the following formula:

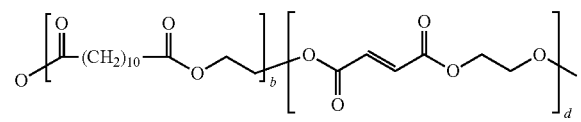

wherein b is from about 5 to about 2000 and d is from about 5 to about 2000, although the values of b and d can be outside of these ranges. Another suitable crystalline resin is of the formula

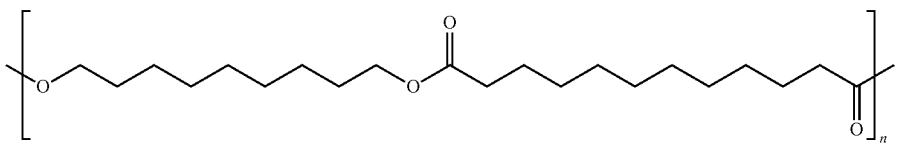

wherein n represents the number of repeat monomer units.

Emulsification

The emulsion to prepare emulsion aggregation particles can be prepared by any desired or effective method, such as a solventless emulsification method or phase inversion process as disclosed in, for example, U.S. Patent Publications 2007/0141494 and 2009/0208864, the disclosures of each of which are totally incorporated herein by reference. As disclosed in 2007/0141494, the process includes forming an emulsion comprising a disperse phase including a first aqueous composition and a continuous phase including molten one or more ingredients of a toner composition, wherein there is absent a toner resin solvent in the continuous phase; performing a phase inversion to create a phase inversed emulsion comprising a disperse phase including toner-sized droplets comprising the molten one or more ingredients of the toner composition and a continuous phase including a second aqueous composition; and solidifying the toner-sized droplets to result in toner particles. As disclosed in 2009/0208864, the process includes melt mixing a resin in the absence of a organic solvent, optionally adding a surfactant to the resin, optionally adding one or more additional ingredients of a toner composition to the resin, adding to the resin a basic agent and water, performing a phase inversion to create a phase inversed emulsion including a disperse phase comprising toner-sized droplets including the molten resin and the optional ingredients of the toner composition, and solidifying the toner-sized droplets to result in toner particles.

Also suitable for preparing the emulsion is the solvent flash method, as disclosed in, for example, U.S. Pat. No. 7,029,817, the disclosure of which is totally incorporated herein by reference. As disclosed therein, the process includes dissolving the resin in a water miscible organic solvent, mixing with hot water, and thereafter removing the organic solvent from the mixture by flash methods, thereby forming an emulsion of the resin in water. The solvent can be removed by distillation and recycled for future emulsifications.

Any other desired or effective emulsification process can also be used.

Toner

The toner particles can be prepared by any desired or effective method. Although embodiments relating to toner particle production are described below with respect to emulsion-aggregation processes, any suitable method of preparing toner particles may be used, including chemical processes, such as suspension and encapsulation processes disclosed in U.S. Pat. Nos. 5,290,654 and 5,302,486, the disclosures of each of which are totally incorporated herein by reference. Toner compositions and toner particles can be prepared by aggregation and coalescence processes in which small-size resin particles are aggregated to the appropriate toner particle size and then coalesced to achieve the final toner-particle shape and morphology.

Toner compositions can be prepared by emulsion-aggregation processes that include aggregating a mixture of an optional colorant, an optional wax, any other desired or required additives, and emulsions including the selected resins described above, optionally in surfactants, and then coalescing the aggregate mixture. A mixture can be prepared by adding an optional colorant and optionally a wax or other materials, which can also be optionally in a dispersion(s) including a surfactant, to the emulsion, which can also be a mixture of two or more emulsions containing the resin.

Surfactants

Examples of nonionic surfactants include polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, available from Rhone-Poulenc as IGEPAL CA-210™ IGEPAL CA-520™, IGEPAL CA-720™, IGEPAL CO-890™, IGEPAL CO-720™, IGEPAL CO-290™, IGEPAL CA-210™, ANTAROX 890™, and ANTAROX 897™. Other examples of suitable nonionic surfactants include a block copolymer of polyethylene oxide and polypropylene oxide, including those commercially available as SYNPERONIC PE/F, such as SYNPERONIC PE/F 108.

Anionic surfactants include sulfates and sulfonates, sodium dodecylsulfate (SDS), sodium dodecylbenzene sulfonate, sodium dodecylnaphthalene sulfate, dialkyl benzenealkyl sulfates and sulfonates, acids such as abitic acid available from Aldrich, NEOGEN R™, NEOGEN SC™ available from Daiichi Kogyo Seiyaku, combinations thereof, and the like. Other suitable anionic surfactants include DOWFAX™ 2A1, an alkyldiphenyloxide disulfonate from Dow Chemical Company, and/or TAYCA POWER BN2060 from Tayca Corporation (Japan), which are branched sodium dodecyl benzene sulfonates. Combinations of these surfactants and any of the foregoing anionic surfactants can be used.

Examples of cationic surfactants, which are usually positively charged, include alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecylbenzyl triethyl ammonium chloride, MIRAPOL™ and ALKAQUAT™, available from Alkaril Chemical Company, SANIZOL™ (benzalkonium chloride), available from Kao Chemicals, and the like, as well as mixtures thereof.

Wax

Optionally, a wax can also be combined with the resin and other toner components in forming toner particles. When included, the wax can be present in any desired or effective amount, in one embodiment at least about 1 percent by weight, and in another embodiment at least about 5 percent by weight, and in one embodiment no more than about 25 percent by weight, and in another embodiment no more than about 20 percent by weight, although the amount can be outside of these ranges. Examples of suitable waxes include (but are not limited to) those having, for example, a weight average molecular weight of in one embodiment at least about 500, and in another embodiment at least about 1,000, and in one embodiment no more than about 20,000, and in another embodiment no more than about 10,000, although the weight average molecular weight can be outside of these ranges. Examples of suitable waxes include, but are not limited to, polyolefins, such as polyethylene, polypropylene, and polybutene waxes, including those commercially available from Allied Chemical and Petrolite Corporation, for example POLYWAX™ polyethylene waxes from Baker Petrolite, wax emulsions available from Michaelman, Inc. and Daniels Products Company, EPOLENE N-15™ commercially available from Eastman Chemical Products, Inc., and VISCOL 550-P™, a low weight average molecular weight polypropylene available from Sanyo Kasei K. K., and the like; plant-based waxes, such as carnauba wax, rice wax, candelilla wax, sumacs wax, jojoba oil, and the like; animal-based waxes, such as beeswax and the like; mineral-based waxes and petroleum-based waxes, such as montan wax, ozokerite, ceresin, paraffin wax, microcrystalline wax, Fischer-Tropsch wax, and the like; ester waxes obtained from higher fatty acids and higher alcohols, such as stearyl stearate, behenyl behenate, and the like; ester waxes obtained from higher fatty acid and monovalent or multivalent lower alcohols, such as butyl stearate, propyl oleate, glyceride monostearate, glyceride distearate, pentaerythritol tetrabehenate, and the like; ester waxes obtained from higher fatty acids and multivalent alcohol multimers, such as diethyleneglycol monostearate, dipropyleneglycol distearate, diglyceryl distearate, triglyceryl tetrastearate, and the like; sorbitan higher fatty acid ester waxes, such as sorbitan monostearate and the like; and cholesterol higher fatty acid ester waxes, such as cholesteryl stearate and the like; and the like, as well as mixtures thereof. Examples of suitable functionalized waxes include, but are not limited to, amines, amides, for example AQUA SUPERSLIP 6550™, SUPERSLIP 6530™ available from Micro Powder Inc., fluorinated waxes, for example POLYFLUO 190™, POLYFLUO 200™, POLYSILK 19™, POLYSILK 14™ available from Micro Powder Inc., mixed fluorinated amide waxes, for example MICROSPERSION 19™ available from Micro Powder Inc., imides, esters, quaternary amines, carboxylic acids or acrylic polymer emulsions, for example JONCRYL 74™, 89™, 130™, 537™, and 538™, all available from SC Johnson Wax, chlorinated polypropylenes and polyethylenes available from Allied Chemical and Petrolite Corporation and SC Johnson wax, and the like, as well as mixtures thereof. Mixtures and combinations of the foregoing waxes can also be used. Waxes can be included as, for example, fuser roll release agents. When included, the wax can be present in any desired or effective amount, in one embodiment at least about 1 percent by weight, and in another embodiment at least about 5 percent by weight, and in one embodiment no more than about 25 percent by weight, and in another embodiment no more than about 20 percent by weight, although the amount can be outside of these ranges.

Colorants

Examples of suitable colorants include pigments, dyes, mixtures thereof, and the like. Specific examples include, but are not limited to, carbon black; magnetite; HELIOGEN BLUE L6900, D6840, D7080, D7020, PYLAM OIL BLUE, PYLAM OIL YELLOW, and PIGMENT BLUE 1, available from Paul Uhlich and Company, Inc.; PIGMENT VIOLET 1, PIGMENT RED 48, LEMON CHROME YELLOW DCC 1026, E.D. TOLUIDINE RED, and BON RED C, available from Dominion Color Corporation, Ltd., Toronto, Ontario; NOVAPERM YELLOW FGL and HOSTAPERM PINK E, available from Hoechst; CINQUASIA MAGENTA, available from E.I. DuPont de Nemours and Company; 2,9-dimethyl-substituted quinacridone and anthraquinone dye identified in the Color Index as CI-60710, CI Dispersed Red 15, diazo dye identified in the Color Index as CI-26050, CI Solvent Red 19, copper tetra(octadecyl sulfonamido) phthalocyanine, x-copper phthalocyanine pigment listed in the Color Index as CI-74160, CI Pigment Blue, Anthrathrene Blue identified in the Color Index as CI-69810, Special Blue X-2137, diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy acetoacetanilide, Yellow 180, Permanent Yellow FGL; Neopen Yellow 075, Neopen Yellow 159, Neopen Orange 252, Neopen Red 336, Neopen Red 335, Neopen Red 366, Neopen Blue 808, Neopen Black X53, Neopen Black X55; Pigment Blue 15:3 having a Color Index Constitution Number of 74160, Magenta Pigment Red 81:3 having a Color Index Constitution Number of 45160:3, Yellow 17 having a Color Index Constitution Number of 21105; Pigment Red 122 (2,9-dimethylquinacridone), Pigment Red 185, Pigment Red 192, Pigment Red 202, Pigment Red 206, Pigment Red 235, Pigment Red 269, combinations thereof, and the like.

The colorant is present in the toner in any desired or effective amount, in one embodiment at least about 1 percent by weight of the toner, and in another embodiment at least about 2 percent by weight of the toner, and in one embodiment no more than about 25 percent by weight of the toner, and in another embodiment no more than about 15 percent by weight of the toner, although the amount can be outside of these ranges.

Toner Preparation

The pH of the resulting mixture can be adjusted by an acid, such as acetic acid, nitric acid, or the like. In specific embodiments, the pH of the mixture can be adjusted to from about 2 to about 4.5, although the pH can be outside of this range. Additionally, if desired, the mixture can be homogenized. If the mixture is homogenized, homogenization can be performed by mixing at from about 600 to about 4,000 revolutions per minute, although the speed of mixing can be outside of this range. Homogenization can be performed by any desired or effective method, for example, with an IKA ULTRA TURRAX T50 probe homogenizer.

Following preparation of the above mixture, an aggregating agent can be added to the mixture. Any desired or effective aggregating agent can be used to form a toner. Suitable aggregating agents include, but are not limited to, aqueous solutions of divalent cations or a multivalent cations. Specific examples of aggregating agents include polyaluminum halides such as polyaluminum chloride (PAC), or the corresponding bromide, fluoride, or iodide, polyaluminum silicates, such as polyaluminum sulfosilicate (PASS), and water soluble metal salts, including aluminum chloride, aluminum nitrite, aluminum sulfate, potassium aluminum sulfate, calcium acetate, calcium chloride, calcium nitrite, calcium oxylate, calcium sulfate, magnesium acetate, magnesium nitrate, magnesium sulfate, zinc acetate, zinc nitrate, zinc sulfate, zinc chloride, zinc bromide, magnesium bromide, copper chloride, copper sulfate, and the like, as well as mixtures thereof. In specific embodiments, the aggregating agent can be added to the mixture at a temperature below the glass transition temperature (Tg) of the resin.

The aggregating agent can be added to the mixture used to form a toner in any desired or effective amount, in one embodiment at least about 0.1 percent by weight, in another embodiment at least about 0.2 percent by weight, and in yet another embodiment at least about 0.5 percent by weight, and in one embodiment no more than about 8 percent by weight, and in another embodiment no more than about 5 percent weight of the resin in the mixture, although the amounts can be outside of these ranges.

To control aggregation and coalescence of the particles, the aggregating agent can, if desired, be metered into the mixture over time. For example, the agent can be metered into the mixture over a period of in one embodiment at least about 5 minutes, and in another embodiment at least about 30 minutes, and in one embodiment no more than about 240 minutes, and in another embodiment no more than about 200 minutes, although more or less time can be used. The addition of the agent can also be performed while the mixture is maintained under stirred conditions, in one embodiment at least about 50 rpm, and in another embodiment at least about 100 rpm, and in one embodiment no more than about 1,000 rpm, and in another embodiment no more than about 500 rpm, although the mixing speed can be outside of these ranges, and, in some specific embodiments, at a temperature that is below the glass transition temperature of the resin as discussed above, in one specific embodiment at least about 30° C., in another specific embodiment at least about 35° C., and in one specific embodiment no more than about 90° C., and in another specific embodiment no more than about 70° C., although the temperature can be outside of these ranges.

The particles can be permitted to aggregate until a predetermined desired particle size is obtained. A predetermined desired size refers to the desired particle size to be obtained as determined prior to formation, with the particle size being monitored during the growth process until this particle size is reached. Samples can be taken during the growth process and analyzed, for example with a Coulter Counter, for average particle size. Aggregation can thus proceed by maintaining the elevated temperature, or by slowly raising the temperature to, for example, from about 40° C. to about 100° C. (although the temperature can be outside of this range), and holding the mixture at this temperature for a time from about 0.5 hours to about 6 hours, in embodiments from about hour 1 to about 5 hours (although time periods outside of these ranges can be used), while maintaining stirring, to provide the aggregated particles. Once the predetermined desired particle size is reached, the growth process is halted. In embodiments, the predetermined desired particle size is within the toner particle size ranges mentioned above.

The growth and shaping of the particles following addition of the aggregation agent can be performed under any suitable conditions. For example, the growth and shaping can be conducted under conditions in which aggregation occurs separate from coalescence. For separate aggregation and coalescence stages, the aggregation process can be conducted under shearing conditions at an elevated temperature, for example of from about 40° C. to about 90° C., in embodiments from about 45° C. to about 80° C., which may be below the glass transition temperature of the resin as discussed above.

Shell Formation

An optional shell can then be applied to the formed aggregated toner particles. Any resin described above as suitable for the core resin can be used as the shell resin. The shell resin can be applied to the aggregated particles by any desired or effective method. For example, the shell resin can be in an emulsion, including a surfactant. The aggregated particles described above can be combined with said shell resin emulsion so that the shell resin forms a shell over the formed aggregates. In one specific embodiment, an amorphous polyester can be used to form a shell over the aggregates to form toner particles having a core-shell configuration.

Once the desired final size of the toner particles is achieved, the pH of the mixture can be adjusted with a base to a value in one embodiment of from about 6 to about 10, and in another embodiment of from about 6.2 to about 7, although a pH outside of these ranges can be used. The adjustment of the pH can be used to freeze, that is to stop, toner growth. The base used to stop toner growth can include any suitable base, such as alkali metal hydroxides, including sodium hydroxide and potassium hydroxide, ammonium hydroxide, combinations thereof, and the like. In specific embodiments, ethylene diamine tetraacetic acid (EDTA) can be added to help adjust the pH to the desired values noted above. In specific embodiments, the base can be added in amounts from about 2 to about 25 percent by weight of the mixture, and in more specific embodiments from about 4 to about 10 percent by weight of the mixture, although amounts outside of these ranges can be used.

Coalescence

Following aggregation to the desired particle size, with the formation of the optional shell as described above, the particles can then be coalesced to the desired final shape, the coalescence being achieved by, for example, heating the mixture to any desired or effective temperature, in one embodiment at least about 55° C., and in another embodiment at least about 65° C., and in one embodiment no more than about 100° C., and in another embodiment no more than about 75° C., and in one specific embodiment about 70° C., although temperatures outside of these ranges can be used, which can be below the melting point of the crystalline resin to prevent plasticization. Higher or lower temperatures may be used, it being understood that the temperature is a function of the resins used for the binder.

Coalescence can proceed and be performed over any desired or effective period of time, in one embodiment at least about 0.1 hour, and in another embodiment at least 0.5 hour, and in one embodiment no more than about 9 hours, and in another embodiment no more than about 4 hours, although periods of time outside of these ranges can be used.

After coalescence, the mixture can be cooled to room temperature, typically from about 20° C. to about 25° C. (although temperatures outside of this range can be used). The cooling can be rapid or slow, as desired. A suitable cooling method can include introducing cold water to a jacket around the reactor. After cooling, the toner particles can be optionally washed with water and then dried. Drying can be accomplished by any suitable method for drying including, for example, freeze-drying.

Optional Additives

The toner particles can also contain other optional additives as desired. For example, the toner can include positive or negative charge control agents in any desired or effective amount, in one embodiment in an amount of at least about 0.1 percent by weight of the toner, and in another embodiment at least about 1 percent by weight of the toner, and in one embodiment no more than about 10 percent by weight of the toner, and in another embodiment no more than about 3 percent by weight of the toner, although amounts outside of these ranges can be used. Examples of suitable charge control agents include, but are not limited to, quaternary ammonium compounds inclusive of alkyl pyridinium halides; bisulfates; alkyl pyridinium compounds, including those disclosed in U.S. Pat. No. 4,298,672, the disclosure of which is totally incorporated herein by reference; organic sulfate and sulfonate compositions, including those disclosed in U.S. Pat. No. 4,338,390, the disclosure of which is totally incorporated herein by reference; cetyl pyridinium tetrafluoroborates; distearyl dimethyl ammonium methyl sulfate; aluminum salts such as BONTRON E84™ or E88™ (Hodogaya Chemical); and the like, as well as mixtures thereof. Such charge control agents can be applied simultaneously with the optional shell resin described above or after application of the optional shell resin.

There can also be blended with the toner particles external additive particles, including flow aid additives, which can be present on the surfaces of the toner particles. Examples of these additives include, but are not limited to, metal oxides, such as titanium oxide, silicon oxide, tin oxide, and the like, as well as mixtures thereof; colloidal and amorphous silicas, such as AEROSIL®, metal salts and metal salts of fatty acids including zinc stearate, aluminum oxides, cerium oxides, and the like, as well as mixtures thereof. Each of these external additives can be present in any desired or effective amount, in one embodiment at least about 0.1 percent by weight of the toner, and in another embodiment at least about 0.25 percent by weight of the toner, and in one embodiment no more than about 5 percent by weight of the toner, and in another embodiment no more than about 3 percent by weight of the toner, although amounts outside these ranges can be used. Suitable additives include, but are not limited to, those disclosed in U.S. Pat. Nos. 3,590,000, 3,800,588, and 6,214,507, the disclosures of each of which are totally incorporated herein by reference. Again, these additives can be applied simultaneously with an optional shell resin described above or after application of an optional shell resin.

The toner particles can be formulated into a developer composition. The toner particles can be mixed with carrier particles to achieve a two-component developer composition. The toner concentration in the developer can be of any desired or effective concentration, in one embodiment at least about 1 percent, and in another embodiment at least about 2 percent, and in one embodiment no more than about 25 percent, and in another embodiment no more than about 15 percent by weight of the total weight of the developer, although amounts outside these ranges can be used.

The toner particles have a circularity of in one embodiment at least about 0.920, in another embodiment at least about 0.940, in yet another embodiment at least about 0.962, and in still another embodiment at least about 0.965, and in one embodiment no more than about 0.999, in another embodiment no more than about 0.990, and in yet another embodiment no more than about 0.980, although the value can be outside of these ranges. A circularity of 1.000 indicates a completely circular sphere. Circularity can be measured with, for example, a Sysmex FPIA 2100 analyzer.

Emulsion aggregation processes provide greater control over the distribution of toner particle sizes and can limit the amount of both fine and coarse toner particles in the toner. The toner particles can have a relatively narrow particle size distribution with a lower number ratio geometric standard deviation (GSDn) of in one embodiment at least about 1.15, in another embodiment at least about 1.18, and in yet another embodiment at least about 1.20, and in one embodiment no more than about 1.40, in another embodiment no more than about 1.35, in yet another embodiment no more than about 1.30, and in still another embodiment no more than about 1.25, although the value can be outside of these ranges.

The toner particles can have a volume average diameter (also referred to as "volume average particle diameter" or "$D_{50v}$") of in one embodiment at least about 3 μm, in another embodiment at least about 4 μm, and in yet another embodiment at least about 5 μm, and in one embodiment no more than about 25 μm, in another embodiment no more than about 15 μm, and in yet another embodiment no more than about 12 μm, although the value can be outside of these ranges. $D_{50v}$, GSDv, and GSDn can be determined using a measuring instrument such as a Beckman Coulter Multisizer 3, operated in accordance with the manufacturer's instructions. Representative sampling can occur as follows: a small amount of toner sample, about 1 gram, can be obtained and filtered through a 25 micrometer screen, then put in isotonic solution to obtain a concentration of about 10%, with the sample then run in a Beckman Coulter Multisizer 3.

The toner particles can have a shape factor of in one embodiment at least about 105, and in another embodiment at least about 110, and in one embodiment no more than about 170, and in another embodiment no more than about 160, SF1*a, although the value can be outside of these ranges. Scanning electron microscopy (SEM) can be used to determine the shape factor analysis of the toners by SEM and image analysis (IA). The average particle shapes are quantified by employing the following shape factor (SF1*a) formula: $SF1*a=100\pi d^2/(4A)$, where A is the area of the particle and d is its major axis. A perfectly circular or spherical particle has a shape factor of exactly 100. The shape factor SF1*a increases as the shape becomes more irregular or elongated in shape with a higher surface area.

The characteristics of the toner particles may be determined by any suitable technique and apparatus and are not limited to the instruments and techniques indicated hereinabove.

In embodiments where the toner resin is crosslinkable, such crosslinking can be performed in any desired or effective manner. For example, the toner resin can be crosslinked during fusing of the toner to the substrate when the toner resin is crosslinkable at the fusing temperature. Crosslinking can also be effected by heating the fused image to a temperature at which the toner resin will be crosslinked, for example in a post-fusing operation. In specific embodiments, crosslinking can be effected at temperatures of in one embodiment about 160° C. or less, in another embodiment from about 70° C. to about 160° C., and in yet another embodiment from about 80° C. to about 140° C., although temperatures outside these ranges can be used.

Specific embodiments will now be described in detail. These examples are intended to be illustrative, and the claims are not limited to the materials, conditions, or process parameters set forth in these embodiments. All parts and percentages are by weight unless otherwise indicated.

Examples I-XII

Polyester resins comprising 50 weight percent bio-based content were prepared as follows. Reactors (2 L Buchi in Examples I and II; 1 L Parr in Examples III-XII) equipped with a mechanical stirrer, bottom drain valve, and distillation apparatus were charged with dimethyl terephthalate (DMT, Examples I-XI only; obtained from Sigma-Aldrich, USA), dimethyl naphthalene-2,6-dicarboxylate (NDC, Example XII only; obtained from Amoco, USA), bio-based succinic acid (SA, Example XII only; obtained from Sigma-Aldrich, USA), bio-based 1,2-propylene glycol (PG, obtained from Archer Daniels Midland, USA), rosin-maleic anhydride (RMA, Examples I-VII only; obtained from Harima Chemical, Japan), rosin-fumarate (R-F1, Examples IV-XII only; obtained from Harima Chemical, Japan), rosin-acrylate (R-Ac, Examples VIII-XII only; obtained from Harima Chemical, Japan), 2-dodecenyl succinic anhydride (DSA, obtained from Ivanhoe Chemicals, USA), and either VERTEC AC422 catalyst (Example I; obtained from Johnson Matthey Specialty Chemicals, USA) or FASCAT 4100 catalyst (Examples II-VII; obtained from Arkema Incorporated, USA) or both (Examples VIII-XII). In each case, the reactor was blanketed with nitrogen and the temperature of the reactor was slowly raised to 190° C. (Examples I-VII) or 170° C. (Examples VIII-XII) with stirring once the solids melted. This reaction mixture was maintained for 16 h under nitrogen while methanol was continuously collected in a collection flask. The reaction mixture was then slowly heated to 205° C. and low vacuum was applied for 30 minutes. The vacuum was then switched to a higher vacuum (<0.1 Torr). During this time, ethylene glycol distilled off and when a first softening point ($Ts_1$, listed in the table) of the resin was reached, the reactor temperature was reduced to 150° C. (Examples I-III) or 180° C. (Examples IV-XII) and citric acid (CA; Examples I-III; obtained from Sigma-Aldrich) or rosin-fumarate (R-F2; Examples IV-VII; obtained from Harima Chemicals) was added. (Citric acid was not added in Examples VIII-XII.) The reaction mixture temperature was slowly raised to 170° C. (Examples I-III) or 200° C. (Examples IV-VII) over 2 h (Examples I-III) or 1 h (Examples IV-VII), after which the reactor temperature was increased to 210° C. (Examples I-III), 225° C. (Examples IV-VI), or 230° C. (Examples VII-XII) and the pressure was reduced to 0.1 mmHg. The reaction was allowed to heat for another 4 h (Examples I-III), 6 h (Examples IV-VI), 9 h (Example VII), or 5 h (Examples VIII-XII) until a second softening point ($Ts_2$, listed in the table) was achieved, followed by discharging the resin. An emulsion was subsequently prepared by either (1) the solvent flash method using ethyl acetate as the solvent (Examples I-III and VIII-XII) or (2) the phase inversion process using methyl ethyl ketone and isopropanol as the solvent (Examples IV-VII) to result in a solids content and particle size as shown in the table below for Examples I-VII and a carbon to oxygen ratio (C/O) and bio-content percentage (BM) for Examples VIII-XII. Specific amounts in grams (Examples I-VII) or percent by weight (Examples VIII-XII) were as follows:

Ingredient Amounts for Examples I-VII

| Ex. | DMT | PG | RMA | R-F1 | DSA | cat. | CA | R-F2 |
|---|---|---|---|---|---|---|---|---|
| I | 349.6 g | 513.7 g | 129.6 g | 0 | 159.6 g | 2.7 g | 34.6 g | 0 |
| II | 372.9 g | 513.7 g | 129.6 g | 0 | 127.7 g | 2.2 g | 34.6 g | 0 |
| III | 207.3 g | 299.6 g | 88.2 g | 0 | 93.1 g | 1.0 g | 10.1 g | 0 |
| IV | 180 g | 299.6 g | 52.9 g | 63 g | 93.6 g | 1.0 g | 0 | 26.5 g |
| V | 186.9 g | 299.6 g | 50.4 g | 66.2 g | 83.8 g | 1.0 g | 0 | 26.5 g |
| VI | 180.1 g | 299.6 g | 50.4 g | 71.4 g | 93.1 g | 1.0 g | 0 | 21.2 g |
| VII | 180.1 g | 299.6 g | 37.8 g | 79.4 g | 93.1 g | 1.0 g | 0 | 26.5 g |

Ingredient Amounts for Examples VIII-XII

| Ex. | DMT | NDC | SA | PG | R-Ac | R-F1 + R-F2 | DSA | cat. |
|---|---|---|---|---|---|---|---|---|
| VIII | 27.7% | 0 | 0 | 50.8% | 5.1% | 5.9% | 10.0% | 0.3% |
| IX | 28.7% | 0 | 0 | 51.0% | 4.1% | 6.8% | 9.4% | 0.3% |
| X | 28.7% | 0 | 0 | 51.0% | 4.1% | 6.8% | 9.4% | 0.3% |
| XI | 28.7% | 0 | 0 | 51.0% | 4.1% | 6.8% | 9.4% | 0.3% |
| XII | 0 | 12.1% | 12.1% | 50.8% | 6.7% | 6.4% | 11.9% | 0.3% |

Characteristics of Resins of Examples I-VII

| Ex. | $Ts_1$ (° C.) | $Ts_2$ (° C.) | Tg (° C.) | acid value (g/g KOH) | $M_n$ (g/mol) | $M_w$ (g/mol) | solids content (%) | particle size (nm) |
|---|---|---|---|---|---|---|---|---|
| I | 106 | 113 | 54.9 | 14.8 | 3,886 | 25,968 | 21.88 | 190 |
| II | 105.8 | 116.8 | 57.0 | 21.9 | 3,867 | 50,008 | 21.5 | 210 |
| III | 105.4 | 116.3 | 53.7 | 11.8 | 4,445 | 126,477 | 21.8 | 195 |
| IV | 101.9 | 113.7 | 56.3 | 15.9 | 3,300 | 24,800 | 24.4 | 177 |
| V | 101.7 | 118.3 | 57.0 | 15.1 | 3,600 | 50,200 | 24.8 | 170 |
| VI | 101.9 | 115.2 | 54.3 | 15.1 | 2,700 | 20,900 | 35.61 | 183 |
| VII | 101.2 | 128.7 | 56.8 | 12.4 | 3,600 | 221,833 | 33.71 | 157 |

Characteristics of Resins of Examples VIII-XII

| Ex. | Ts (° C.) | Tg (° C.) | acid value (g/g KOH) | $M_n$ (g/mol) | $M_w$ (g/mol) | C/O | BM (%) |
|---|---|---|---|---|---|---|---|
| VIII | 115.4 | 55.4 | 6.09 | 2,305 | 12,958 | 3.95 | 49.0 |
| IX | 113.1 | 56.4 | 15.15 | 2,936 | 17,235 | 3.85 | 49.0 |
| X | 119.1 | 58.0 | 11.82 | 3,389 | 32,066 | 3.85 | 49.0 |
| XI | 138.0 | 57.8 | 14.59 | 3,745 | 233,991 | 3.85 | 49.0 |
| XII | 111.2 | 44.0 | 8.04 | 3,952 | 73,240 | 4.19 | 57.8 |

Rheology values were measured for the resins of Examples VIII through XII with a TA Instruments AR-2000 Advanced Rheometer System. Values measured were: storage modulus (G'), in units of Pascals, which is the stress in phase with the deformation divided by the strain, or a measure of the elasticity of the sample; loss modulus (G"), in units of Pascals, which is the stress 90° out of phase with the deformation divided by the strain, or a measure of the viscous nature of the sample; complex viscosity (n*), in units of Pascal-seconds, which is the complex modulus divided by the frequency, a value used in shear testing; tan (delta), which is the ratio of the loss modulus to the storage modulus and represents the damping properties of the sample; strain, in terms of percentage, which is the amount of deformation of the sample, normalized to take into account the type of geometry (e.g., parallel plate, cone and plate, tensile) and the specimen dimensions; and delta, measured in radians, which is the angle that indicates the phase shift between the strain wave and the stress wave. Rheology values for the resin of Example VIII were as follows:

| Temp. (° C.) | G' (Pa) | G" (Pa) | tan (delta) | |n*| (Pa·s) | % strain | time (min) |
| --- | --- | --- | --- | --- | --- | --- |
| 60 | −1.53E+08 | 4.64E+07 | −0.3028 | 2.55E+07 | 1.72E−03 | 21.1 |
| 70 | 3.05E+06 | 3.20E+07 | 10.49 | 5.11E+06 | 2.66E−03 | 35.3 |
| 80 | 4.73E+05 | 1.33E+06 | 2.824 | 2.25E+05 | 0.036047 | 48 |
| 90 | 89870 | 2.03E+05 | 2.259 | 35330 | 0.22609 | 61.7 |
| 100 | 15720 | 48850 | 3.107 | 8167 | 0.97538 | 75.5 |
| 110 | 2580 | 13470 | 5.221 | 2182 | 3.65 | 89.6 |
| 120 | 408.2 | 4149 | 10.16 | 663.5 | 12.01 | 103.6 |
| 130 | 63.53 | 1401 | 22.05 | 223.2 | 35.692 | 117.6 |
| 140 | 11.24 | 514.7 | 45.79 | 81.93 | 96.574 | 131.6 |
| 150 | 2.806 | 224.3 | 79.95 | 35.7 | 214.13 | 145.8 |
| 160 | 0.6209 | 108.5 | 174.7 | 17.27 | 392.11 | 159.8 |
| 170 | 0.01136 | 56.63 | 4983 | 9.012 | 567.08 | 173.8 |

Rheology values for the resin of Example IX were as follows:

| Temp. (° C.) | G' (Pa) | G" (Pa) | tan(delta) | |n*| (Pa·s) | % strain | time (min) |
| --- | --- | --- | --- | --- | --- | --- |
| 60 | −9.14E+07 | 1.60E+07 | −0.1755 | 1.48E+07 | 1.51E−03 | 24.5 |
| 70 | −2.14E+07 | 5.45E+07 | −2.547 | 9.33E+06 | 1.90E−03 | 38.3 |
| 80 | 6.33E+05 | 2.25E+06 | 3.555 | 3.72E+05 | 0.022039 | 51.4 |
| 90 | 1.02E+05 | 2.70E+05 | 2.652 | 45840 | 0.17435 | 65.1 |
| 100 | 12960 | 52470 | 4.049 | 8601 | 0.92591 | 79 |
| 110 | 1494 | 12650 | 8.465 | 2027 | 3.9288 | 92.9 |
| 120 | 160.8 | 3447 | 21.43 | 549.1 | 14.502 | 107 |
| 130 | 19.46 | 1052 | 54.07 | 167.5 | 47.472 | 121.1 |
| 140 | 3.179 | 386 | 121.4 | 61.44 | 127.79 | 135.2 |
| 150 | 0.4419 | 167.6 | 379.2 | 26.67 | 277.35 | 149.2 |
| 160 | −0.09384 | 81.74 | −871 | 13.01 | 472.82 | 163.1 |
| 170 | −0.2326 | 43.2 | −185.7 | 6.875 | 625.68 | 177.2 |

Rheology values for the resin of Example X were as follows:

| Temp. (° C.) | G' (Pa) | G" (Pa) | tan(delta) | |n*| (Pa·s) | % strain | time (min) |
| --- | --- | --- | --- | --- | --- | --- |
| 60 | −9.97E+07 | 3.65E+07 | −0.3662 | 1.69E+07 | 1.89E−03 | 22.7 |
| 70 | −4.90E+07 | 1.06E+08 | −2.164 | 1.86E+07 | 2.19E−03 | 36.9 |
| 80 | 9.55E+05 | 3.53E+06 | 3.691 | 5.81E+05 | 0.014475 | 49.6 |
| 90 | 1.79E+05 | 3.76E+05 | 2.1 | 66310 | 0.12103 | 63.3 |
| 100 | 35680 | 86720 | 2.431 | 14920 | 0.53425 | 77.1 |
| 110 | 6894 | 24260 | 3.519 | 4013 | 1.9846 | 91.1 |
| 120 | 1300 | 7437 | 5.722 | 1202 | 6.6316 | 105.1 |
| 130 | 235.1 | 2429 | 10.33 | 388.3 | 20.534 | 119.1 |
| 140 | 45.12 | 881.8 | 19.54 | 140.5 | 56.699 | 133.1 |
| 150 | 10.39 | 374.3 | 36.04 | 59.59 | 132.49 | 147.2 |
| 160 | 2.545 | 178.1 | 69.99 | 28.35 | 267.78 | 161.2 |
| 170 | 0.5173 | 91.87 | 177.6 | 14.62 | 460.37 | 175.4 |

Rheology values for the resin of Example XI were as follows:

| Temp. (° C.) | G' (Pa) | G" (Pa) | tan(delta) | |n*| (Pa·s) | % strain | time (min) |
| --- | --- | --- | --- | --- | --- | --- |
| 60 | −1.07E+08 | 4.98E+07 | −0.4639 | 1.88E+07 | 1.52E−03 | 25.4 |
| 70 | −1.28E+08 | 7.98E+07 | −0.6255 | 2.39E+07 | 1.62E−03 | 39.5 |
| 80 | 1.42E+06 | 5.49E+06 | 3.88 | 9.03E+05 | 9.47E−03 | 52.5 |
| 90 | 2.58E+05 | 5.23E+05 | 2.026 | 92840 | 0.086571 | 66.2 |
| 100 | 59520 | 1.14E+05 | 1.909 | 20410 | 0.39086 | 80 |
| 110 | 16860 | 34500 | 2.046 | 6111 | 1.3041 | 94 |
| 120 | 5800 | 12780 | 2.204 | 2234 | 3.5702 | 108.1 |
| 130 | 2324 | 5448 | 2.345 | 942.6 | 8.4828 | 122 |
| 140 | 1028 | 2552 | 2.482 | 437.9 | 18.344 | 136 |
| 150 | 485 | 1289 | 2.657 | 219.1 | 36.946 | 150 |

-continued

| Temp. (° C.) | G' (Pa) | G'' (Pa) | tan(delta) | |n*| (Pa · s) | % strain | time (min) |
|---|---|---|---|---|---|---|
| 160 | 235.4 | 694.1 | 2.948 | 116.6 | 70.122 | 163.9 |
| 170 | 113.1 | 396.8 | 3.507 | 65.67 | 125.33 | 178 |

Rheology values for the resin of Example XII were as follows:

| Temp. (° C.) | G' (Pa) | G'' (Pa) | Delta ° | |n*| (Pa · s) | % strain | time (sec) |
|---|---|---|---|---|---|---|
| 60 | −1.81E+07 | 4.15E+07 | 113.5 | 7.21E+06 | 2.61E−03 | 607.27 |
| 70 | 7.38E+05 | 2.18E+06 | 71.25 | 3.66E+05 | 2.28E−02 | 1360.9 |
| 80 | 1.54E+05 | 3.09E+05 | 63.53 | 54930 | 1.46E−01 | 2173.6 |
| 90 | 31470 | 71740 | 66.31 | 12470 | 6.40E−03 | 3005.4 |
| 100 | 7308 | 21460 | 71.19 | 3608 | 2.2081 | 3842.5 |
| 110 | 1798 | 7256 | 76.09 | 1190 | 6.6994 | 4682 |
| 120 | 439.7 | 2630 | 80.51 | 424.4 | 18.804 | 5522.9 |
| 130 | 106.3 | 1028 | 84.1 | 164.5 | 48.541 | 6363.4 |
| 140 | 26.32 | 450.3 | 86.66 | 71.78 | 110.92 | 7202.3 |
| 150 | 6.712 | 216.5 | 88.22 | 34.47 | 226.97 | 8045.2 |
| 160 | 1.789 | 112.5 | 89.09 | 17.9 | 411.66 | 8889 |
| 170 | 0.4554 | 62.37 | 89.58 | 9.926 | 639.13 | 9731 |

As the values in the tables indicate, various acid values can be obtained without adding citric acid. In addition, the molecular weight and rheology can be varied by varying the reaction conditions without a major change in Tg, which allows making a toner within target Tg range with the ability to vary the rheology of the toner particle to achieve different fusing characteristics.

Example XIII

In a 2 L Hoppes reactor equipped with a heated bottom drain valve, high viscosity double turbine agitator, and distillation receiver with a cold water condenser were charged 900 g sebacic acid, obtained from Sigma-Aldrich, 84 g fumaric acid, obtained from Sigma-Aldrich, 655.2 g ethylene glycol, obtained from Sigma-Aldrich, and 1.5 g butyltin hydroxide oxide as the catalyst, obtained from Arkema Inc. The reactor was heated to 190° C. with stirring for 3 hours and then heated to 210° C. over a one hour period, after which the pressure was slowly reduced from atmospheric pressure to about 260 Torr over a one hour period, and then reduced to 5 Torr over a two hour period, and then further reduced to about 1 Torr over a 30 minute period. The resulting polymer was then allowed to cool to 185° C., 24 g trimellitic anhydride, obtained from Sigma-Aldrich was added, and the mixture was stirred for an additional hour followed by discharge through the bottom drain. The crystalline polyester resin had a softening point of 93° C. (29 Poise viscosity measured by cone and plate viscometer at 199° C.) and a melting point range of 70 to 80° C. as measured by DSC, and an acid value of 10 meq/g KOH. An aqueous emulsion of the resin was prepared by dissolving 100 g of resin in ethyl acetate (600 g) and the mixture was added to 1 L of water containing 2 g of sodium bicarbonate and homogenized for 20 minutes at 4000 rpm, followed by heating to 80-85° C. to distill off the ethyl acetate. The resultant aqueous crystalline polyester emulsion had a solids content of 34.9% by weight and displayed a particle size of 155 nanometers.

Example XIV

An emulsion aggregation cyan toner was prepared as follows. To a 2 L glass reactor equipped with an overhead mixer was added 107 g of the amorphous emulsion of Example II, 107.4 g of the amorphous emulsion of Example III, 23.4 g of the crystalline polyester emulsion of Example XIII, 34.04 g carnauba wax emulsion, obtained from Toa Kasei Co., Ltd. (Japan), and 28.21 g cyan pigment Pigment Blue 15:3, obtained from Sun Chemicals (USA), 39.83 g $Al_2(SO_4)_3$, obtained from Sigma-Aldrich, was added in as a flocculent under homogenization. The mixture was heated to 38.3° C. for aggregation at 300 rpm. The particle size was monitored with a Coulter Counter until the core particles reached a volume average particle size of 4.68 μm with a GSD of 1.23, after which 52 g of the resin emulsion of Example II and 52 g of the resin emulsion of Example III was added as a shell, resulting in core-shell structured particles with an average particle size of 5.71 μm, GSD 1.23. Thereafter, the pH of the reaction slurry was increased to 8 using 3.08 g EDTA and NaOH to freeze the toner growth. After freezing, the reaction mixture was heated to 85° C. and pH was reduced to 7.5 for coalescence. The toner was quenched after coalescence, and had a final particle size of 6.28 μm, GSD of 1.25, and circularity of 0.976. The toner slurry was then cooled to room temperature, separated by sieving (25 μm), filtered, washed, and freeze dried.

Unfused images were generated from a developer of this toner using a modified XEROX DocuColor-12® copier where the fuser had been disabled. A TMA (Toner Mass per unit Area) image of 1.00 mg/cm$^2$ was made on XEROX® Color Xpressions+ paper, 90 gsm, uncoated, P/N 3R11540 and used for gloss, crease, and hot offset measurements. Gloss/crease targets were a square image placed in the center of the page.

Figure 2:
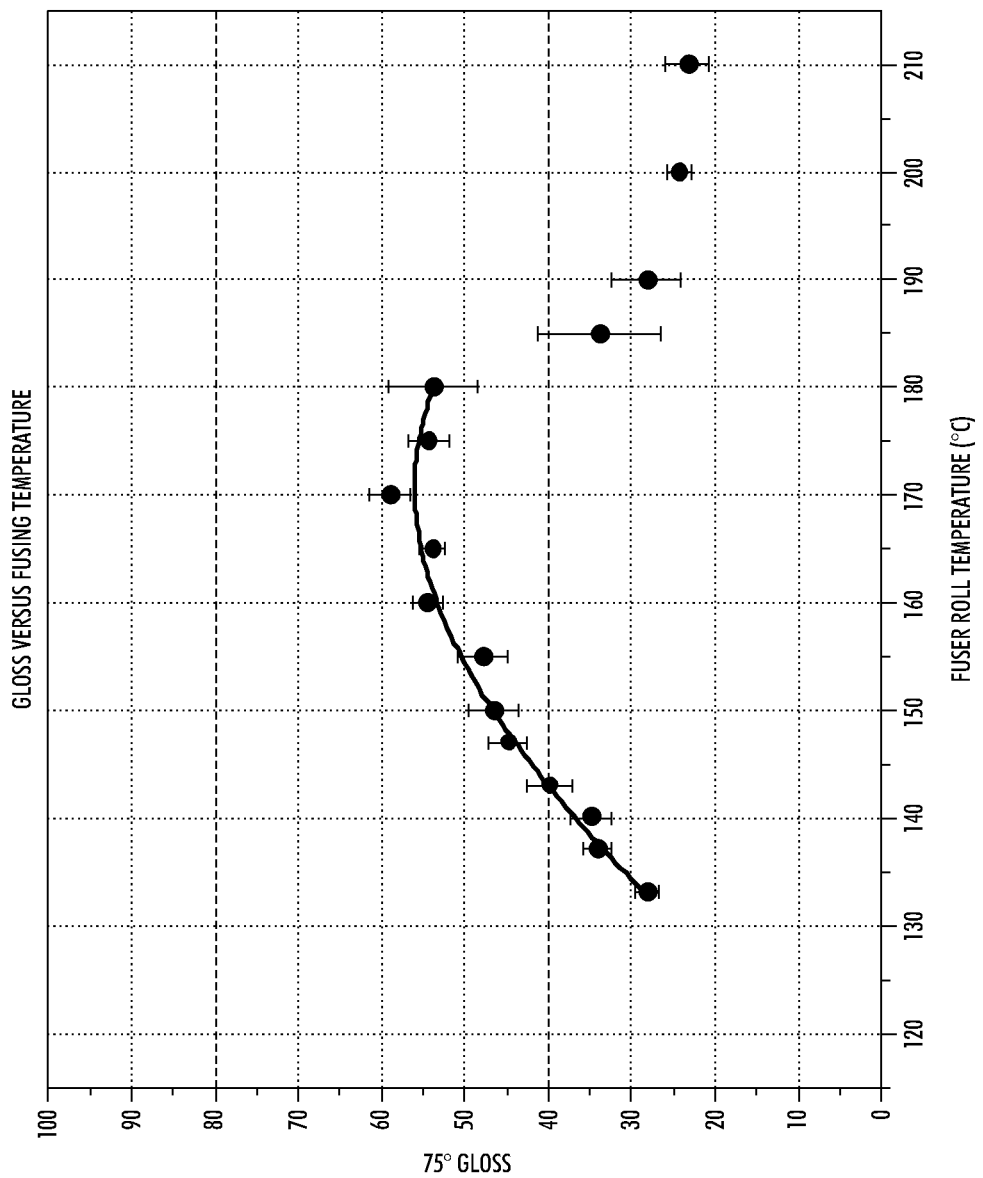
FIG. 2 is a curve representing the plot of gloss as a function of temperature for the toner of Example IX.

The offline generated image samples were then fused with a XEROX® 700 Digital Color Press (DCP) Fusing fixture. A production fuser customer replaceable unit was fitted with an external motor and temperature control along with paper transports. Process speed of the XEROX® 700 DCP fuser was set to 220 mm/s (nip dwell of ~34 ms) and the fuser roll temperature was varied from cold offset to hot offset or up to 210° C. for gloss and crease measurements on the samples. After the set point temperature of the fuser roll had been changed there was a ten minute wait to allow the temperature of the belt and pressure assembly to stabilize. The crease curve as a function of temperature is displayed in FIG. 1. A minimum fix temperature of 140° C. was determined at crease of 80. The gloss curve as a function of temperature is displayed in FIG. 2. A gloss value of about 30 to about 60 was achieved from a temperature range of from about 140° C. to about 190° C.

Example XV

An emulsion aggregation cyan toner was prepared as follows. To a 2 L glass reactor equipped with an overhead mixer was added 85.43 g of the polyester emulsion of Example V, 90.24 g of the polyester emulsion of Example VI, 36.45 g polymethylene wax dispersion (obtained from IGI Chemicals, USA), and 41.80 g cyan pigment Pigment Blue 15:3. 41.82 g $Al_2(SO_4)_3$ was added in as flocculent under homogenization. The mixture was heated to 51° C. for aggregation at 300 rpm. The particle size was monitored with a Coulter Counter until the core particles reached a volume average particle size of 4.88 μm with a GSD of 1.23, after which 47.18 g of the emulsion of Example V and 49.84 g of the emulsion of Example VI were added as a shell, resulting in core-shell structured particles with an average particle size of 5.77 μm, GSD 1.23. Thereafter, the pH of the reaction slurry was increased to 9 using 9.69 g EDTA and NaOH to freeze the toner growth. After freezing, the reaction mixture was heated to 85° C., and pH was reduced to 7.5 for coalescence. The toner was quenched after coalescence, and had a final particle size of 6.34 μm, GSD of 1.30, and circularity of 0.980. The toner slurry was then cooled to room temperature, separated by sieving (25 μm), filtered, washed, and freeze dried.

Example XVI

The process of Example II is repeated except that equimolar amounts of the following modified rosins are substituted for maleic anhydride-modified rosin:
  XVI(a) maleic acid-modified rosin
  XVI(b) fumaric acid-modified rosin
  XVI(c) acrylic acid-modified rosin
  XVI(d) itaconic acid-modified rosin
  XVI(e) fumaric anhydride-modified rosin
  XVI(f) acrylic anhydride-modified rosin
  XVI(g) itaconic anhydride-modified rosin
The resulting products are incorporated into a toner by the method of Example XIV. It is believed that similar results will be obtained.

Example XVII

The process of Example II is repeated except that:
  XVII(a) 30 mole percent of 1,2-propylene glycol is replaced with dimer diol, available from Uniqema, New Castle, Del.
  XVII(b) 70 mole percent of 1,2-propylene glycol is replaced with 1,4:3,6-dianhydro-D-sorbitol, prepared as disclosed in, for example, Fleche et al., *Starch/Starke*, 38(1), pp. 26-30 (1986), and Ballauff et al., Polyesters (Derived from Renewable Sources), *Polymeric Materials Encyclopedia*, Vol. 8, p. 5892 (1996), the disclosures of each of which are totally incorporated herein by reference.
The resulting products are incorporated into a toner by the method of Example XIV. It is believed that similar results will be obtained.

Example XVIII

To a 2 L Buchi reactor is added 400 g of rosin-acrylate and 1 L of dry toluene. The mixture is cooled to −10° C. To this mixture is added dropwise over a 1 h period 25 g of lithium aluminum hydride in a 2M solution of toluene. After an additional mixing of 2 h, the mixture is allowed to warm up to 25° C. The mixture is then drained into 1 L of water, and to this is added 5 g of sodium bicarbonate. The organic fraction is then separated, washed with brine, and distilled to afford the corresponding rosin-diol.

Example XIX

The process of Example XVIII is repeated with rosin-fumarate to afford the corresponding rosin-triol.

Example XX

A polyester resin derived from 400 g of the rosin-diol of Example XVIII, 100 g of propylene glycol, and 200 g of succinic acid is made by the procedure of Examples I-VI. A toner is made with the product by the method of Example XV. It is believed that similar results will be observed.

Example XXI

A polyester resin derived from 400 g of the rosin-diol of Example XVIII, 100 g of propylene glycol, and 400 g of rosin-acrylate is made by the procedure of Examples I-VI. A toner is made with the product by the method of Example XV. It is believed that similar results will be observed.

Example XXII

To a 2 L glass reactor equipped with an overhead mixer was added 214.44 g of the resin emulsion prepared in Example VIII (19.30 wt % solids in water and containing 3 wt % DOWFAX surfactant), and 38.33 g of an aqueous solution containing 5.6 wt % solids $Al_2(SO_4)_3$ was added in as flocculent under homogenization. The mixture was heated to 49.4° C. for aggregation at 300 rpm. The particle size was monitored with a Coulter Counter until the particles reached a volume average particle size of 5.77 μm with a GSD of 1.21, and the pH of the reaction slurry was then increased to 9 using 3.47 g of a solution containing 39 wt. % solids EDTA in 1M NaOH, followed by 7.02 g of a solution containing 47 wt % DOWFAX in water to freeze the toner growth. After freezing, the reaction mixture was heated to 75° C. and the pH was reduced by addition of 0.1M nitric acid to 7.5 for coalescence. The toner was quenched after coalescence, and had a final particle size of 8.50 microns, GSD of 1.35. The toner slurry was then cooled to room temperature, separated by sieving (25 μm), filtered, washed, and freeze dried.

Example XXIII

To a 2 L glass reactor equipped with an overhead mixer was added 245.13 g resin emulsion prepared in Example X (24.82 wt % solids in water), 36.45 g polymethylene wax dispersion (obtained from IGI Chemicals, USA) (30.37 wt % solids in water), and 41.80 g cyan pigment PB15:3 (17.21 wt % pigment solids in water). 29.99 g $Al_2(SO_4)_3$ (1 wt % solids in water) was added in as flocculent under homogenization. The mixture was heated to 49° C. for aggregation at 250 rpm. The particle size was monitored with a Coulter Counter until the core particles reached a volume average particle size of 4.49

μm with a GSD of 1.27, and then 135.38 g of the resin emulsion prepared as described in Example X was added as shell, resulting in core-shell structured particles with an average particle size of 7.04 microns, GSD 1.23. Thereafter, the pH of the reaction slurry was increased to 9 using 4.62 g EDTA (39 wt. % solids in 1M NaOH) to freeze the toner growth. After freezing, the reaction mixture was heated to 85° C., and pH was reduced by addition of 0.1M nitric acid to 7.4 for coalescence. The toner was quenched after coalescence, and had a final particle size of 6.75 microns, GSD of 1.24, and circularity of 0.978. The toner slurry was then cooled to room temperature, separated by sieving (25 μm), and filtered, followed by washing and freeze drying.

Example XXIV

To a 2 L Buchi is added 400 g of maleic anhydride-modified rosin and 45.6 g pentaerythritol. The mixture is then heated to 200° C. under a nitrogen blanket. To this mixture is added a bleaching mixture consisting of 0.5% calcium hypophosphite, 0.25% of a 50% strength solution of active hypophosphorous acid, and 0.3% of a phenol sulfide bleaching agent (VULTAC 2, available from Arkema, Inc., Philadelphia, Pa.). The reaction mixture is then heated to 270° C. under a nitrogen purge until an acid number of about 14 is reached, usually about 15 h reaction time including a 2 h heat-up time. The material is then subjected to a stripping treatment with nitrogen gas at 100 mmHg at 270° C. for about 1 h to reduce the acid number to about 10, yielding a pentaerythritol ester of maleic anhydride-modified rosin with a softening point of about 100° C.

Example XXV

To a 2 L Buchi is added 400 g of maleic anhydride-modified rosin and 2.0 g of VULTAC 2. The mixture is heated to 170° C. with stirring under a nitrogen blanket. At 170° C., 48.8 g of glycerol is added and the heating is increased until the contents reaches 260° C., at which it is held for the duration of the reaction. A steam-jacketed condenser is used to permit removal of water through the condenser while returning condensed glycerol back to the Buchi during the reaction. Additional charges of VULTAC 2 are added at 4.0 h and 8.0 h reaction time, each charge in the amount of 0.4 g. The acid number is monitored and when it has been reduced to about 10, volatile components are stripped off and the esterified rosin is cooled and discharged. The final softening point of the glycerol ester of maleic anhydride-modified rosin product is about 83° C.

Example XXVI

To a 2 L Buchi is added 200 g of rosin and 200 g of 97% formic acid. The mixture is heated to a temperature of 100° C. for a period of about 3 h. At the end of this time the reaction mixture is discharged, cooled to room temperature, and poured into an excess (V/V) of water. The insoluble dimerized rosin is taken up in ether. The ether solution is washed, dried over anhydrous sodium sulfate, and stripped of ether to yield a product containing 26-30% dimerized rosin as determined by GPC.

Example XXVII

Polyester resins derived from the maleic anhydride modified rosin-pentaerythritol ester of Example XXIV are made by the procedures of Examples I-VI. Toners are made with the products by the method of Example XV. It is believed that similar results will be observed.

Example XXVIII

Polyester resins derived from the maleic anhydride modified rosin-glycerol ester of Example XXV are made by the procedures of Examples I-VI. Toners are made with the products by the method of Example XV. It is believed that similar results will be observed.

Example XXIX

Polyester resins derived from the dimerized rosin of Example XXVI are made by the procedures of Examples I-VI. Toners are made with the products by the method of Example XV. It is believed that similar results will be observed.

Other embodiments and modifications of the present invention may occur to those of ordinary skill in the art subsequent to a review of the information presented herein; these embodiments and modifications, as well as equivalents thereof, are also included within the scope of this invention.

The recited order of processing elements or sequences, or the use of numbers, letters, or other designations therefor, is not intended to limit a claimed process to any order except as specified in the claim itself.

What is claimed is:

1. A polyester resin comprising the polycondensation product of:
   (a) at least one diacid, acid ester, or diester; and
   (b) at least one first diol which is a C36 dimer diol, isosorbide, or mixtures thereof; wherein either
      (i) at least one diacid, acid ester, or diester comprises a rosin diacid, rosin acid ester, or rosin diester; or
      (ii) at least one second diol comprises a rosin diol; and
   wherein at least one of the rosin diacid, rosin acid ester, rosin diester, or rosin diol is either
      (A) an ester of a functionalized rosin or an ester of a reduced functionalized rosin; or
      (B) a dimerized rosin.

2. A polyester resin according to claim 1 wherein at least one diacid, acid ester, or diester comprises a rosin diacid, rosin acid ester, or rosin diester.

3. A polyester resin according to claim 2 wherein the rosin diacid, acid ester, or diester is the reaction product of (A) abietic acid, neoabietic acid, palustric acid, pimaric acid, levo-pimaric acid, isopimaric acid, dehydroabietic acid, sandaracopimaric acid, or a mixture thereof; with (B) acrylic acid, maleic acid, fumaric acid, itaconic acid, or a mixture thereof.

4. A polyester resin according to claim 1 wherein the ester of a functionalized rosin or ester of a reduced functionalized rosin is of the formula

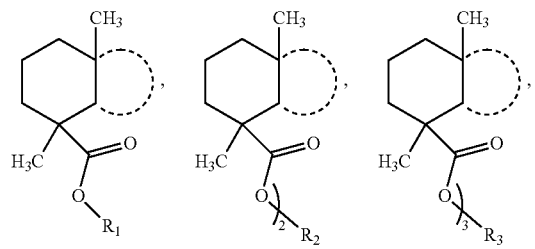

-continued

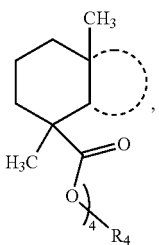

or mixtures thereof;
wherein R₁ is:
  (1) an alkyl group, including substituted and unsubstituted alkyl groups, and wherein hetero atoms either may or may not be present in the alkyl group;
  (2) an aryl group, including substituted and unsubstituted aryl groups, and wherein hetero atoms either may or may not be present in the aryl group;
  (3) an arylalkyl group, including substituted and unsubstituted arylalkyl groups, and wherein hetero atoms either may or may not be present in either or both of the alkyl portion and the aryl portion of the arylalkyl group; or
  4) an alkylaryl group, including substituted and unsubstituted alkylaryl groups, and wherein hetero atoms either may or may not be present in either or both of the alkyl portion and the aryl portion of the alkylaryl group;
wherein R₂ is:
  (1) an alkylene group, including substituted and unsubstituted alkylene groups, and wherein hetero atoms either may or may not be present in the alkylene group;
  (2) an arylene group, including substituted and unsubstituted arylene groups, and wherein hetero atoms either may or may not be present in the arylene group;
  (3) an arylalkylene group, including substituted and unsubstituted arylalkylene groups, and wherein hetero atoms, such as oxygen, nitrogen, sulfur, silicon, phosphorus, boron, and the like either may or may not be present in either or both of the alkyl portion and the aryl portion of the arylalkylene group; or
  (4) an alkylarylene group, including substituted and unsubstituted alkylarylene groups, and wherein hetero atoms either may or may not be present in either or both of the alkyl portion and the aryl portion of the alkylarylene group;
wherein R₃ is:
  (1) an alkylene group, including substituted and unsubstituted alkylene groups, and wherein hetero atoms either may or may not be present in the alkylene group;
  (2) an arylene group, including substituted and unsubstituted arylene groups, and wherein hetero atoms either may or may not be present in the arylene group;
  (3) an arylalkylene group, including substituted and unsubstituted arylalkylene groups, and wherein hetero atoms, such as oxygen, nitrogen, sulfur, silicon, phosphorus, boron, and the like either may or may not be present in either or both of the alkyl portion and the aryl portion of the arylalkylene group; or
  (4) an alkylarylene group, including substituted and unsubstituted alkylarylene groups, and wherein hetero atoms either may or may not be present in either or both of the alkyl portion and the aryl portion of the alkylarylene group; and
wherein R₄ is:
  (1) an alkylene group, including substituted and unsubstituted alkylene groups, and wherein hetero atoms either may or may not be present in the alkylene group;
  (2) an arylene group, including substituted and unsubstituted arylene groups, and wherein hetero atoms either may or may not be present in the arylene group;
  (3) an arylalkylene group, including substituted and unsubstituted arylalkylene groups, and wherein hetero atoms, such as oxygen, nitrogen, sulfur, silicon, phosphorus, boron, and the like either may or may not be present in either or both of the alkyl portion and the aryl portion of the arylalkylene group; or
  (4) an alkylarylene group, including substituted and unsubstituted alkylarylene groups, and wherein hetero atoms either may or may not be present in either or both of the alkyl portion and the aryl portion of the alkylarylene group; and
wherein the dotted arc

represents generically the remainder of a functionalized rosin.

5. A polyester resin according to claim 1 wherein the dimerized rosin is of the formula

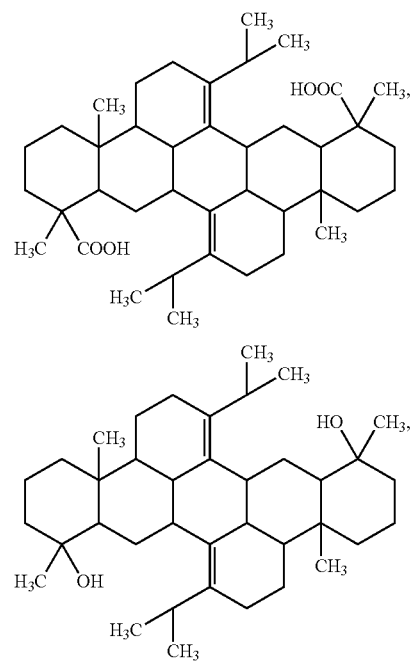

-continued
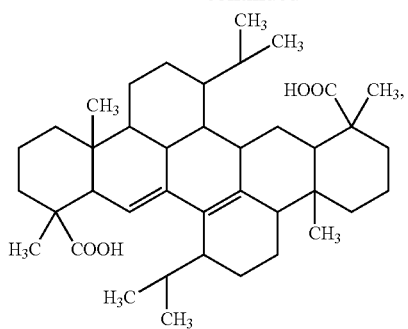
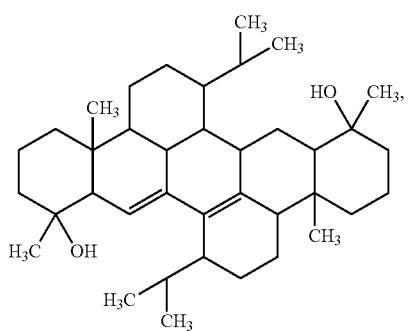
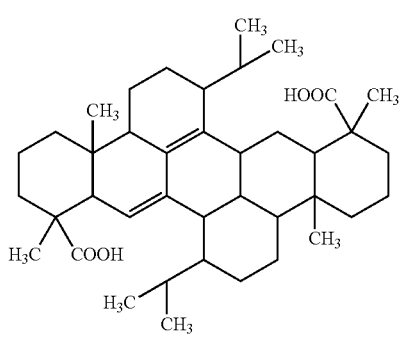
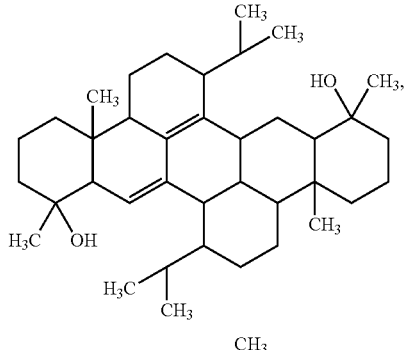
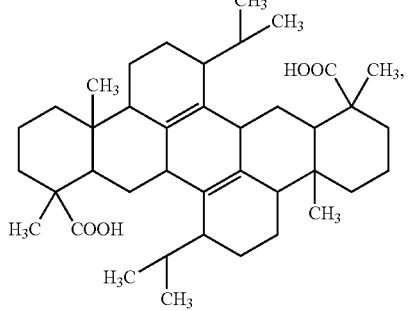
-continued
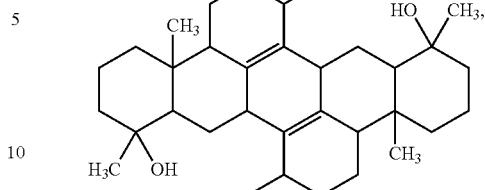
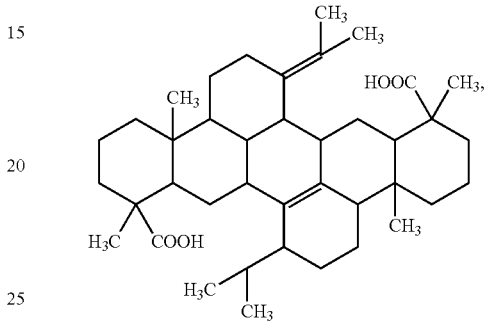
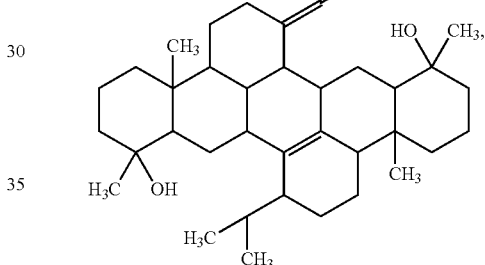
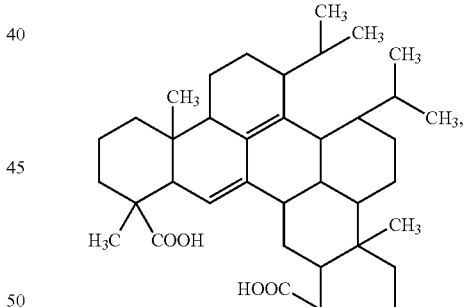
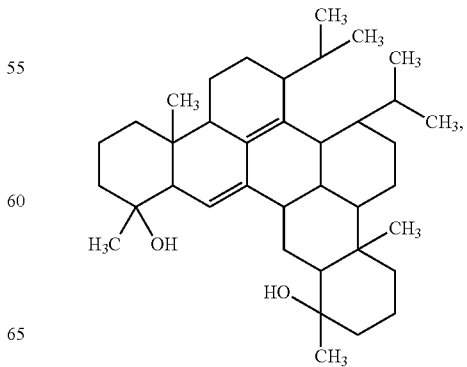

-continued
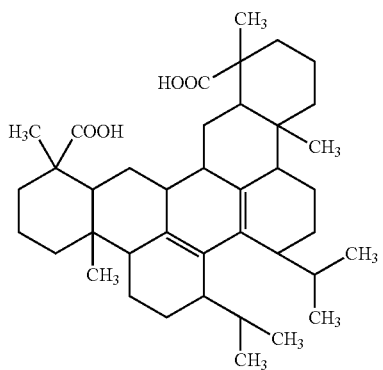
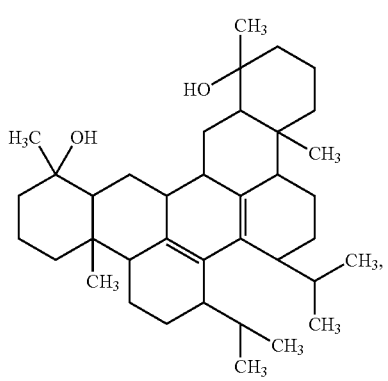
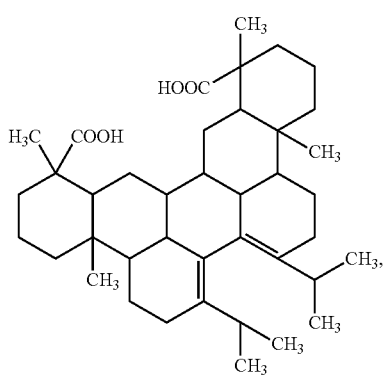
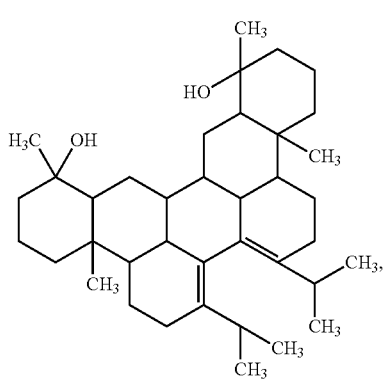
-continued
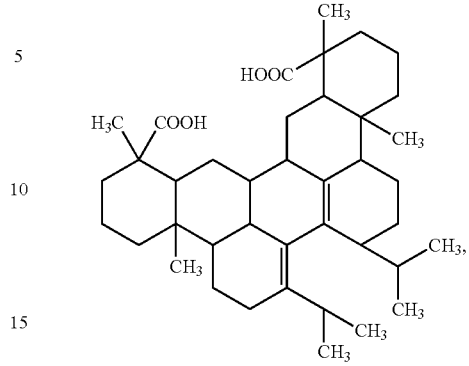
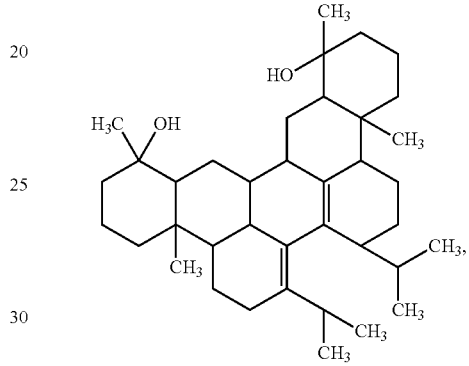
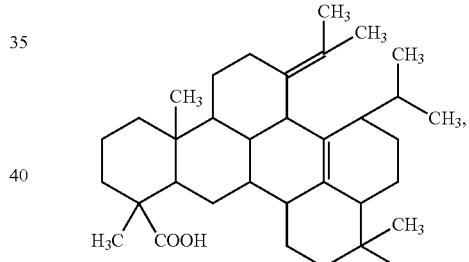
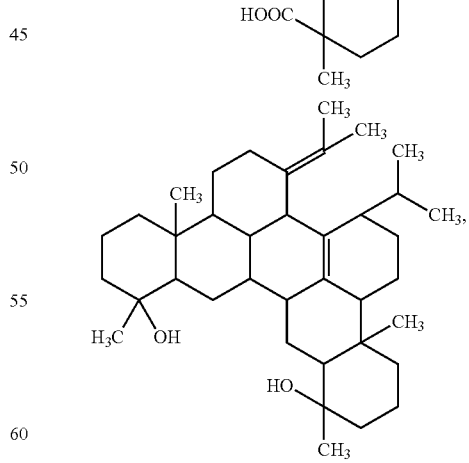
or mixtures thereof.
6. A polyester resin according to claim 1 wherein the ester of a functionalized rosin or ester of a reduced functionalized rosin is of the formula

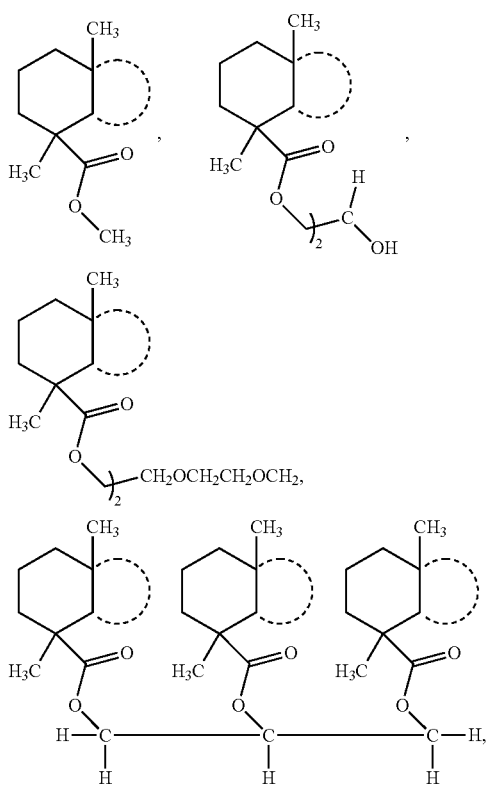

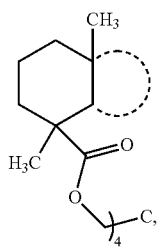

or mixtures thereof;
wherein the dotted arc represents generically the remainder of a functionalized rosin.

7. A toner composition comprising particles which comprise:

(1) a polyester resin; and (2) an optional colorant.

8. A toner composition according to claim 7 wherein the polyester resin is amorphous.

9. A toner composition according to claim 8 further comprising a crystalline polyester resin.

10. A toner composition according to claim 9 wherein the crystalline polyester resin is (A) of the formula

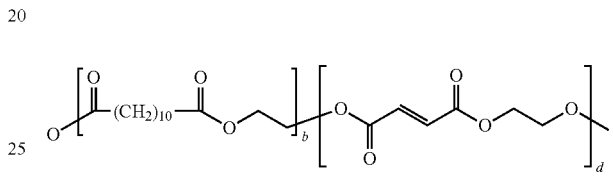

wherein b is from about 5 to about 2000 and d is from about 5 to about 2000; (B) of the formula

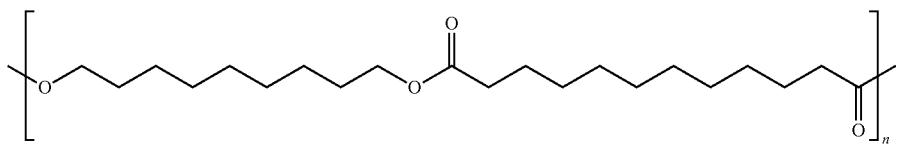

wherein n represents the number of repeat monomer units; or (C) a mixture thereof.

11. A toner composition according to claim 7 wherein:

(a) the particles have a volume average diameter of at least about 3 μm;

(b) the particles have a volume average diameter of no more than about 12 μm; and (c) the particles have a particle size distribution of no more than about 1.35.

12. A toner composition according to claim 7 wherein the toner is an emulsion aggregation toner.

13. A toner composition according to claim 7 having a core-shell structure.

14. A toner composition according to claim 7 wherein the ester of a functionalized rosin or ester of a reduced functionalized rosin is of the formula

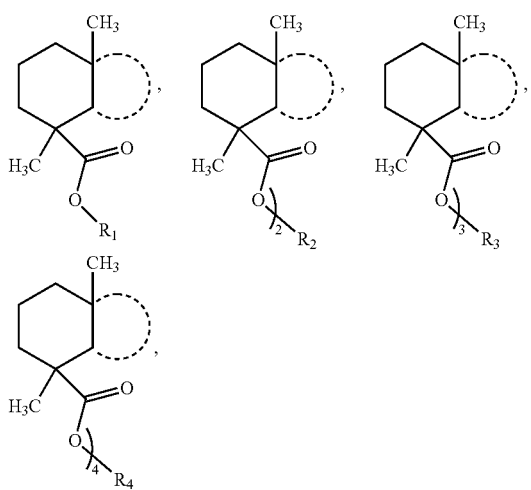

or mixtures thereof;
wherein $R_1$ is:
  (1) an alkyl group, including substituted and unsubstituted alkyl groups, and wherein hetero atoms either may or may not be present in the alkyl group;
  (2) an aryl group, including substituted and unsubstituted aryl groups, and wherein hetero atoms either may or may not be present in the aryl group;
  (3) an arylalkyl group, including substituted and unsubstituted arylalkyl groups, and wherein hetero atoms either may or may not be present in either or both of the alkyl portion and the aryl portion of the arylalkyl group; or
  4) an alkylaryl group, including substituted and unsubstituted alkylaryl groups, and wherein hetero atoms either may or may not be present in either or both of the alkyl portion and the aryl portion of the alkylaryl group;
wherein $R_2$ is:
  (1) an alkylene group, including substituted and unsubstituted alkylene groups, and wherein hetero atoms either may or may not be present in the alkylene group;
  (2) an arylene group, including substituted and unsubstituted arylene groups, and wherein hetero atoms either may or may not be present in the arylene group;
  (3) an arylalkylene group, including substituted and unsubstituted arylalkylene groups, and wherein hetero atoms, such as oxygen, nitrogen, sulfur, silicon, phosphorus, boron, and the like either may or may not be present in either or both of the alkyl portion and the aryl portion of the arylalkylene group; or
  (4) an alkylarylene group, including substituted and unsubstituted alkylarylene groups, and wherein hetero atoms either may or may not be present in either or both of the alkyl portion and the aryl portion of the alkylarylene group;
wherein $R_3$ is:
  (1) an alkylene group, including substituted and unsubstituted alkylene groups, and wherein hetero atoms either may or may not be present in the alkylene group;
  (2) an arylene group, including substituted and unsubstituted arylene groups, and wherein hetero atoms either may or may not be present in the arylene group;
  (3) an arylalkylene group, including substituted and unsubstituted arylalkylene groups, and wherein hetero atoms, such as oxygen, nitrogen, sulfur, silicon, phosphorus, boron, and the like either may or may not be present in either or both of the alkyl portion and the aryl portion of the arylalkylene group; or
  (4) an alkylarylene group, including substituted and unsubstituted alkylarylene groups, and wherein hetero atoms either may or may not be present in either or both of the alkyl portion and the aryl portion of the alkylarylene group; and
wherein $R_4$ is:
  (1) an alkylene group, including substituted and unsubstituted alkylene groups, and wherein hetero atoms either may or may not be present in the alkylene group;
  (2) an arylene group, including substituted and unsubstituted arylene groups, and wherein hetero atoms either may or may not be present in the arylene group;
  (3) an arylalkylene group, including substituted and unsubstituted arylalkylene groups, and wherein hetero atoms, such as oxygen, nitrogen, sulfur, silicon, phosphorus, boron, and the like either may or may not be present in either or both of the alkyl portion and the aryl portion of the arylalkylene group; or
  (4) an alkylarylene group, including substituted and unsubstituted alkylarylene groups, and wherein hetero atoms either may or may not be present in either or both of the alkyl portion and the aryl portion of the alkylarylene group; and
wherein the dotted arc

represents generically the remainder of a functionalized rosin.

15. A toner composition according to claim 7 wherein the ester of a functionalized rosin or ester of a reduced functionalized rosin is of the formula

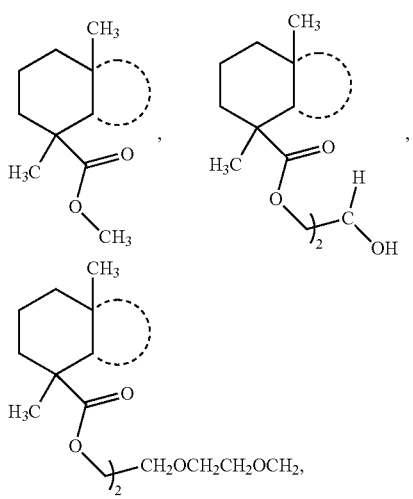

-continued

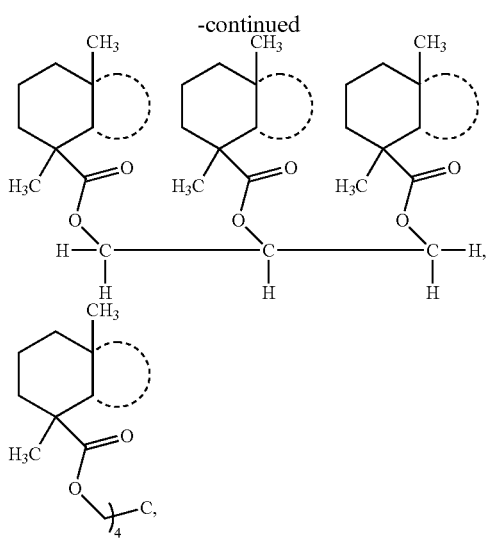

or mixtures thereof;
wherein the dotted arc

represents generically the remainder of a functionalized rosin.

16. A polyester resin comprising the polycondensation product of:
(a) at least one diacid, acid ester, or diester; and
(b) at least one diol; wherein
(i) at least one diacid, acid ester, or diester comprises a rosin diacid, rosin acid ester, or rosin diester; and
(ii) at least one diol comprises a rosin diol; and
wherein at least one of the rosin diacid, rosin acid ester, rosin diester, or rosin diol is either
(A) an ester of a functionalized rosin or an ester of a reduced functionalized rosin; or
(B) a dimerized rosin.

17. A polyester resin comprising the polycondensation product of:
(a) at least one diacid, acid ester, or diester; and
(b) at least one diol; wherein at least one diol comprises a rosin diol; and
wherein at least one of the rosin diacid, rosin acid ester, rosin diester, or rosin diol is either
(A) an ester of a functionalized rosin or an ester of a reduced functionalized rosin; or
(B) a dimerized rosin.

18. A polyester resin according to claim 17, wherein at least one diol is 1,2-propanediol, 1,3-propanediol, propylene glycol, dimer diol, isosorbide, or mixtures thereof.

19. A toner composition comprising particles which comprise:
(1) a polyester resin according to claim 17; and
(2) an optional colorant.

* * * * *